US012623676B2

(12) United States Patent
Kume et al.

(10) Patent No.: US 12,623,676 B2
(45) Date of Patent: May 12, 2026

(54) PRESENTATION CONTROL DEVICE, AUTONOMOUS DRIVING CONTROL DEVICE, AND STORAGE MEDIUM THEREOF

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 174 days.

(21) Appl. No.: 18/389,938

(22) Filed: Dec. 20, 2023

(65) Prior Publication Data

US 2024/0116529 A1 Apr. 11, 2024

Related U.S. Application Data

(63) Continuation of application No. PCT/JP2022/021705, filed on May 27, 2022.

(30) Foreign Application Priority Data

Jul. 1, 2021 (JP) ................................. 2021-110362

(51) Int. Cl.
*B60W 50/14* (2020.01)
*B60W 30/18* (2012.01)
(Continued)

(52) U.S. Cl.
CPC ...... *B60W 50/14* (2013.01); *B60W 30/18163* (2013.01); *B60W 30/182* (2013.01);
(Continued)

(58) Field of Classification Search
CPC ............. B60W 50/14; B60W 60/0051; B60W 30/18163; B60W 30/182; B60W 40/08;
(Continued)

(56) References Cited

U.S. PATENT DOCUMENTS

| | | | | |
|---|---|---|---|---|
| 10,618,523 | B1 * | 4/2020 | Fields .................... | G06Q 40/08 |
| 11,790,776 | B1 * | 10/2023 | Williams ............. | G08G 1/0969 |
| | | | | 340/438 |
| 12,365,363 | B2 * | 7/2025 | Bang ................. | B60W 50/0205 |
| 2014/0067250 | A1 * | 3/2014 | Bone ...................... | G08G 1/167 |
| | | | | 701/301 |

(Continued)

FOREIGN PATENT DOCUMENTS

| | | |
|---|---|---|
| JP | 2011162132 A | 8/2011 |
| JP | 2019119262 A | 7/2019 |

*Primary Examiner* — Naomi J Small

(74) *Attorney, Agent, or Firm* — Harness, Dickey & Pierce, P.L.C.

(57) ABSTRACT

A presentation control device, which controls presentation of information relating to autonomous driving function of a vehicle, is configured to: grasp whether a switch from a driving assist control, which requires a periphery monitoring by a driver as an obligation, to an autonomous traveling control, which does not require the periphery monitoring by the driver as the obligation, becomes possible; grasp whether a lane change by the autonomous driving function is being performed in a state which requires the periphery monitoring by the driver as the obligation; and during a control period of lane change by the driving assist control, in response to the switch to the autonomous traveling control becomes possible, perform a switch possible notification indicating that the switch to the autonomous traveling control becomes possible during the control period.

13 Claims, 10 Drawing Sheets

(51) Int. Cl.

| | |
|---|---|
| *B60W 30/182* | (2020.01) |
| *B60W 40/08* | (2012.01) |
| *B60W 50/08* | (2020.01) |
| *B60W 60/00* | (2020.01) |

(52) U.S. Cl.
CPC .......... *B60W 40/08* (2013.01); *B60W 50/082* (2013.01); *B60W 60/0051* (2020.02); *B60W 2040/0818* (2013.01); *B60W 2050/146* (2013.01); *B60W 2540/223* (2020.02); *B60W 2540/229* (2020.02)

(58) Field of Classification Search
CPC ........ B60W 50/082; B60W 2540/229; B60W 2540/223; B60W 2040/0818; B60W 2050/146
USPC ........................................................ 340/438
See application file for complete search history.

(56) References Cited

U.S. PATENT DOCUMENTS

| | | | | |
|---|---|---|---|---|
| 2017/0234689 | A1* | 8/2017 | Gibson ................ | G05D 1/0061 |
| | | | | 701/25 |
| 2018/0148060 | A1* | 5/2018 | Hashimoto ..... | B60W 30/18163 |
| 2018/0229743 | A1* | 8/2018 | Aoi ........................ | B60W 40/08 |
| 2018/0239352 | A1* | 8/2018 | Wang .................... | B60W 50/14 |
| 2018/0364709 | A1* | 12/2018 | Choi ................... | B60W 50/082 |
| 2019/0072957 | A1* | 3/2019 | Fujimura ............. | B60W 50/14 |
| 2019/0278268 | A1* | 9/2019 | Rezaeian ............. | G05D 1/0061 |
| 2019/0310633 | A1* | 10/2019 | Toyoda ............... | B60W 50/085 |
| 2020/0039559 | A1* | 2/2020 | Aerts ................... | H03K 17/962 |
| 2020/0198648 | A1* | 6/2020 | Ishioka ............... | G05D 1/0088 |
| 2020/0307691 | A1* | 10/2020 | Kalabic ............. | B62D 15/0255 |
| 2020/0339147 | A1* | 10/2020 | Hayakawa ............ | B60K 35/26 |
| 2021/0024097 | A1* | 1/2021 | Jardine ................. | B60W 40/08 |
| 2021/0070221 | A1* | 3/2021 | Neiswander ........... | B60K 35/28 |
| 2022/0063678 | A1* | 3/2022 | Mcpeek-Bechtold ...................... | |
| | | | | B60W 50/082 |

* cited by examiner

PRESENTATION CONTROL DEVICE, AUTONOMOUS DRIVING CONTROL DEVICE, AND STORAGE MEDIUM THEREOF

CROSS REFERENCE TO RELATED APPLICATIONS

The present application is a continuation application of International Patent Application No. PCT/JP2022/021705 filed on May 27, 2022, which designated the U.S. and claims the benefit of priority from Japanese Patent Application No. 2021-110362 filed on Jul. 1, 2021. The entire disclosures of all of the above applications are incorporated herein by reference.

TECHNICAL FIELD

The present disclosure relates to a technique for presenting information related to an autonomous driving function and a technique for enabling traveling using the autonomous driving function.

BACKGROUND

Conventionally, an autonomous driving device that starts autonomous driving of a host vehicle based on an instruction from a driver is widely known. When there are multiple lanes on a traveling road of the host vehicle, the autonomous driving device can perform a lane change control such that the host vehicle can change from a currently traveling lane to another lane.

SUMMARY

The present disclosure provides a presentation control device, which is used in a vehicle capable of traveling with autonomous driving function. The presentation control device controls presentation of information relating to the autonomous driving function. The presentation control device is configured to: grasp whether a switch from a driving assist control, which requires a periphery monitoring by a driver as an obligation, to an autonomous traveling control, which does not require the periphery monitoring by the driver as the obligation, becomes possible; grasp whether a lane change by the autonomous driving function is being performed in a state which requires the periphery monitoring by the driver as the obligation; and during a control period in which a lane change by the driving assist control being performed, in response to the switch to the autonomous traveling control becomes possible, perform a switch possible notification indicating that the switch to the autonomous traveling control becomes possible during the control period.

BRIEF DESCRIPTION OF DRAWINGS

Objects, features and advantages of the present disclosure will become apparent from the following detailed description made with reference to the accompanying drawings. In the drawings:

FIG. 4 is a time chart showing a series of information presentations in a scene where autonomous driving without periphery monitor obligation becomes possible during execution of lane change with LCA;

FIG. 5 is a time chart showing a series of information presentation in a scene where lane change with LCA is performed after autonomous driving without periphery monitoring obligation becomes possible;

DETAILED DESCRIPTION

Figure 1:
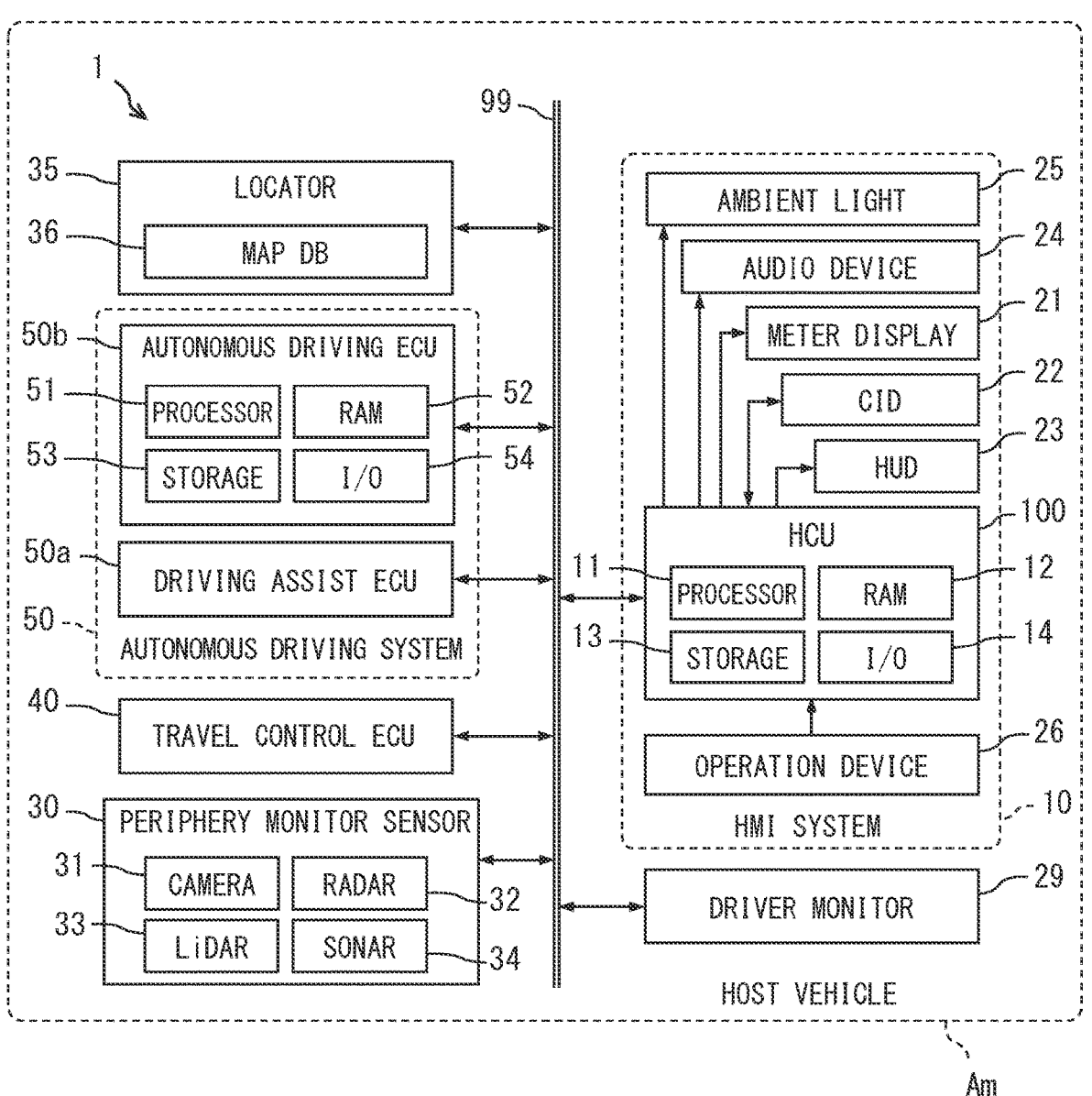
FIG. 1 is a diagram illustrating an overall view of an in-vehicle network including an HCU according to a first embodiment of the present disclosure.

In recent years, a technology that enables not only autonomous driving in which a driver is obligated to monitor periphery of vehicle but also autonomous driving in which the driver is not obligated to monitor periphery of vehicle has been provided. When the autonomous driving in which periphery monitoring is not obligated is possible, a control period of lane change under a state where periphery monitoring is obligated may overlap with a time at which the state where periphery monitoring is obligated switches to a state where periphery monitoring becomes not obligated. In such a scene, if information presentation or vehicle control, which is related to the switch to the state where periphery monitoring becomes not obligated, is not appropriately performed, there is a concern that convenience of autonomous driving may be impaired.

According to an aspect of the present disclosure, a presentation control device is used in a vehicle capable of traveling with autonomous driving function. The presentation control device controls presentation of information relating to the autonomous driving function, and includes: a traveling control grasping unit grasping whether a switch from a driving assist control, which requires a periphery monitoring by a driver as an obligation, to an autonomous traveling control, which does not require the periphery monitoring by the driver as the obligation, becomes possible; and a notification control unit performing a switch possible notification indicating that the switch to the autonomous traveling control becomes possible. The traveling control grasping unit further grasps whether a lane change by the autonomous driving function is being performed in a state which requires the periphery monitoring by the driver as the obligation. During a control period in which a lane change by the driving assist control being performed, in response that the switch to the autonomous traveling control becomes possible, the notification control unit performs the switch possible notification during the control period.

According to another aspect of the present disclosure, a non-transitory computer-readable storage medium stores a presentation control program. The presentation control program is used in a vehicle capable of traveling with autonomous driving function and controls presentation of information relating to the autonomous driving function. The presentation control program includes instructions to be executed by at least one processor, and the instructions includes: grasping whether a switch from a driving assist control, which requires a periphery monitoring by a driver as an obligation, to an autonomous traveling control, which does not require the periphery monitoring by the driver as the obligation, becomes possible; grasping whether a lane change by the autonomous driving function is being performed in a state which requires the periphery monitoring by the driver as the obligation; and during a control period in which a lane change by the driving assist control being performed, in response that the switch to the autonomous traveling control becomes possible, performing a switch possible notification indicating that the switch to the autonomous traveling control becomes possible during the control period.

In the above aspects, switch to the autonomous driving without periphery monitoring obligation becomes possible in the control period during which the lane change is being performed by the driving assist control, switch possible notification notifies that switch to the autonomous traveling control is possible during the control period in which the lane change is being performed. As a result, a time for recognizing that the switch to the autonomous traveling control becomes possible can be secured. Thus, the driver can smoothly start the autonomous driving without periphery monitoring obligation. Thus, it is possible to ensure the convenience of autonomous driving without periphery monitoring obligation.

According to another aspect of the present disclosure, a presentation control device is used in a vehicle capable of traveling with autonomous driving function. The presentation control device controls presentation of information relating to the autonomous driving function. The presentation control device includes: a traveling control grasping unit grasping whether a switch from a driving assist control, which requires a periphery monitoring by a driver as an obligation, to an autonomous traveling control, which does not require the periphery monitoring by the driver as the obligation, becomes possible; and a notification control unit performing a switch possible notification indicating that the switch to the autonomous traveling control becomes possible. The traveling control grasping unit further grasps whether a lane change by the autonomous driving function is being performed in a state which requires the periphery monitoring by the driver as the obligation. During a control period in which a lane change by the driving assist control being performed, even though the switch to the autonomous traveling control becomes possible, the notification control unit suspends performing of the switch possible notification during the control period and performs the switch possible notification after end of the control period.

According to another aspect of the present disclosure, a non-transitory computer-readable storage medium stores a presentation control program. The presentation control program is used in a vehicle capable of traveling with autonomous driving function and controls presentation of information relating to the autonomous driving function. The presentation control program includes instructions to be executed by at least one processor and the instructions includes: grasping whether a switch from a driving assist control, which requires a periphery monitoring by a driver as an obligation, to an autonomous traveling control, which does not require the periphery monitoring by the driver as the obligation, becomes possible; grasping whether a lane change by the autonomous driving function is being performed in a state which requires the periphery monitoring by the driver as the obligation; and during a control period in which a lane change by the driving assist control being performed, even though the switch to the autonomous traveling control becomes possible, suspending performing of a switch possible notification during the control period and performing the switch possible notification after end of the control period.

In the above aspects, when switch to the autonomous driving without periphery monitoring obligation becomes possible in the control period during which the lane change is being performed by the driving assist control, switch possible notification is suspended in the control period during which the lane change is being performed. Thus, presentation of information indicating a content different from a content of vehicle control being executed can be suppressed. Thus, the driver can feel less confused by this configuration. The driver recognizes that a switch to the autonomous traveling control becomes possible by the switch possible notification, which is executed after elapse of the control period. Thus, the driver can smoothly start the autonomous driving without periphery monitoring obligation. According to such a series of information presentation, it is possible to ensure the convenience of autonomous driving without periphery monitoring obligation.

According to another aspect of the present disclosure, a presentation control device is used in a vehicle capable of traveling with autonomous driving function. The presentation control device controls presentation of information relating to the autonomous driving function. The presentation control device includes: a traveling control grasping unit grasping whether a switch from a driving assist control, which requires a periphery monitoring by a driver as an obligation, to an autonomous traveling control, which does not require the periphery monitoring by the driver as the obligation, becomes possible; and a notification control unit performing a switch possible notification indicating that the switch to the autonomous traveling control becomes possible. The traveling control grasping unit further grasps whether a lane change by the autonomous driving function is being performed in a state which requires the periphery monitoring by the driver as the obligation. When the lane change by the driving assist control is started after performing of the switch possible notification and before the switch to the autonomous traveling control, the notification control unit performs the switch possible notification again after end of the lane change under a condition that the switch to the autonomous traveling control is possible after the end of lane change.

According to another aspect of the present disclosure, a non-transitory computer-readable storage medium stores a presentation control program. The presentation control program is used in a vehicle capable of traveling with autonomous driving function and controls presentation of information relating to the autonomous driving function. The presentation control program includes instructions to be executed by at least one processor and the instructions includes: grasping whether a switch from a driving assist control, which requires a periphery monitoring by a driver as an obligation, to an autonomous traveling control, which does not require the periphery monitoring by the driver as the obligation, becomes possible; performing a switch possible notification indicating that the switch to the autonomous traveling control becomes possible; after performing the switch possible notification, grasping whether a lane change by the driving assist control is started before the switch to the autonomous traveling control; and when the lane change by the driving assist control is started before the switch to the autonomous traveling control, performing the switch possible notification again after end of the lane change under a condition that the switch to the autonomous traveling control is possible after the end of lane change.

In the above aspects, when the lane change by the driving assist control is started after the execution of switch possible notification and before the switch to the autonomous traveling control, the switch possible notification is executed again after the end of lane change under a condition that the switch to the autonomous traveling control is possible even after the lane change is ended. Thus, even when the traveling lane of the host vehicle is changed, whether or not the state in which the switch to autonomous traveling control is possible continues can be presented to the driver in an easily understandable manner. As a result, even when the lane change is performed, the autonomous driving without periphery monitoring obligation can be smoothly started. Thus, it is possible to ensure the convenience of autonomous driving without periphery monitoring obligation.

According to another aspect of the present disclosure, an autonomous driving control device enables a vehicle to travel by an autonomous driving function. The autonomous driving control device includes: a switch determination unit determining whether a switch from a driving assist control, which requires a periphery monitoring by a driver as an obligation, to an autonomous traveling control, which does not require the periphery monitoring by the driver as the obligation, is possible; and an assist control grasping unit grasping an execution state of a lane change by the driving assist control. During a control period in which the lane change by the driving assist control being executed, the switch determination unit switches from a first determination state to a second determination state. In the first determination state, the switch determination unit determines whether the switch from the driving assist control to the autonomous traveling control is possible with both of a traveling lane of the vehicle before the lane change is started and a movement destination lane to which the vehicle moves by the lane change as determination targets. In the second determination state, the switch determination unit determines whether the switch to the autonomous traveling control is possible with the movement destination lane as the determination target.

According to another aspect of the present disclosure, a non-transitory computer-readable storage medium stores an autonomous driving control program. The autonomous driving control program enables a vehicle to travel by an autonomous driving function and includes instructions to be executed by at least one processor. The instructions include: grasping an execution state of a lane change by a driving assist control which requires periphery monitoring by a driver of the vehicle as an obligation; determining whether a switch from the driving assist control to an autonomous traveling control, which does not require the periphery monitoring by the driver as the obligation, is possible; and during a control period in which the lane change by the driving assist control being executed, switching from a first determination state to a second determination state, wherein the first determination state determines whether the switch from the driving assist control to the autonomous traveling control is possible with both of a traveling lane of the vehicle before the lane change is started and a movement destination lane to which the vehicle moves by the lane change as determination targets, and the second determination state determines whether the switch to the autonomous traveling control is possible with the movement destination lane as the determination target.

In the above aspects, whether the switch from driving assist control with the periphery monitoring obligation to the autonomous traveling control without periphery monitoring obligation is possible is continued to be determined even in a period in which the lane change is being executed by the driving assist control. Since it can be determined that switch to the autonomous traveling control is possible even in the control period of lane change in some cases, switch to the state in which no monitoring obligation is required can be performed at an early stage. As a result, it is possible to improve the convenience of autonomous driving without periphery monitoring obligation.

The following will describe embodiments of the present disclosure with reference to accompanying drawings. In the following description, the same reference symbols are assigned to corresponding components in each embodiment in order to avoid repetitive descriptions. In each of the embodiments, when only a part of the configuration is described, the remaining parts of the configuration may adopt corresponding parts of other embodiments. Further, not only the combinations of the configurations explicitly shown in the description of the respective embodiments, but also the configurations of the multiple embodiments can be partially combined even if they are not explicitly shown if there is no problem in the combinations in particular.

First Embodiment

Figure 2:
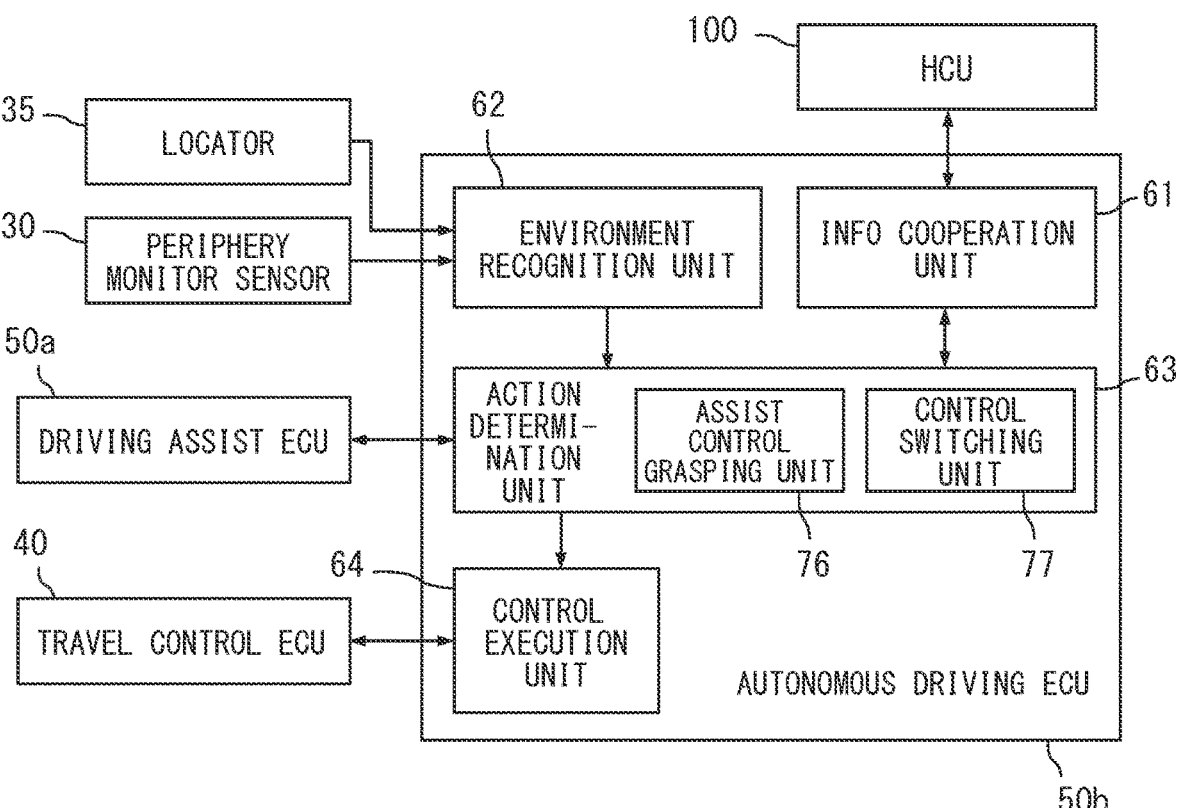
FIG. 2 is a block diagram showing details of an autonomous driving ECU.
Figure 3:
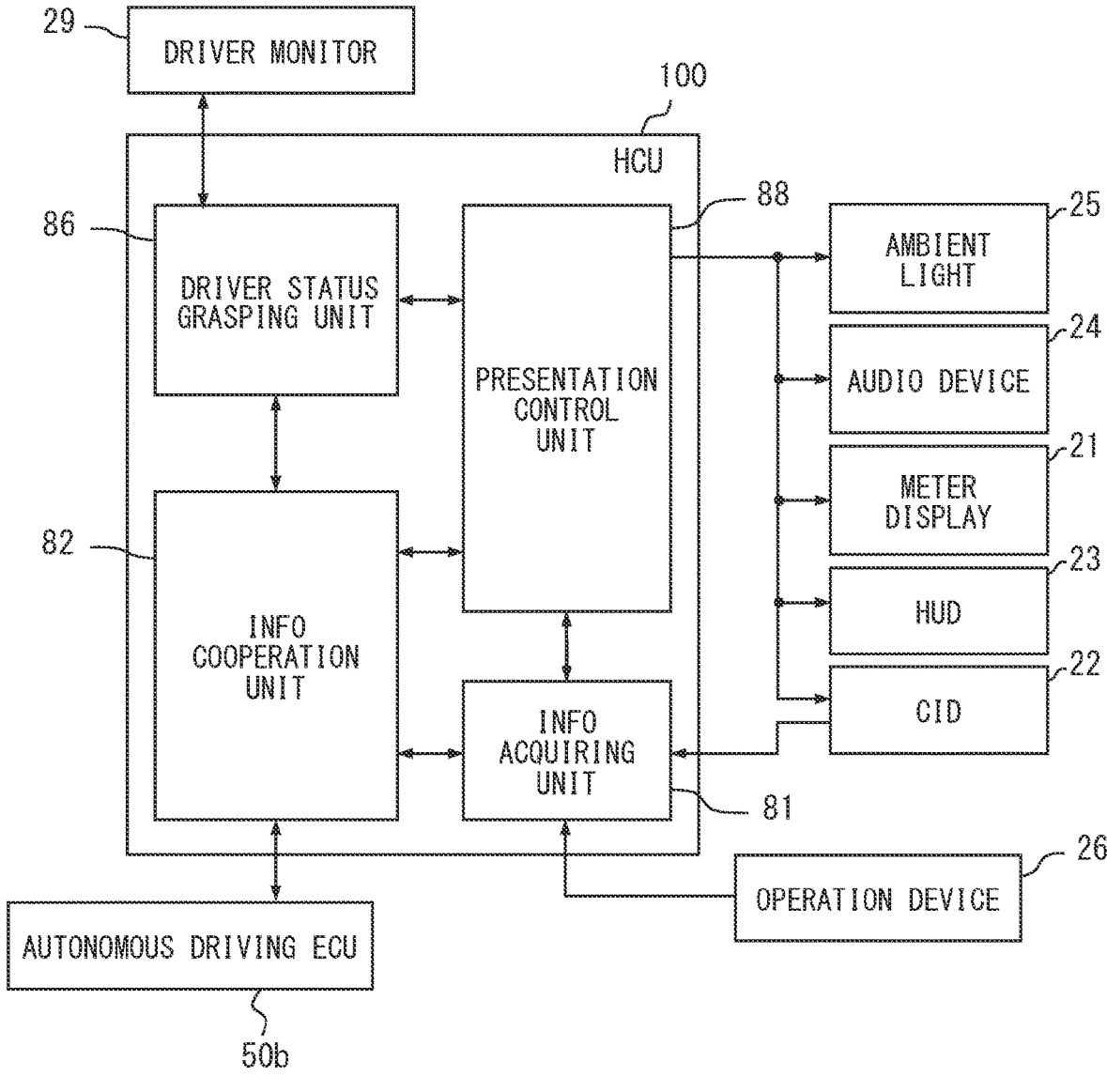
FIG. 3 is a block diagram showing details of an HCU.

According to a first embodiment of the present disclosure, a human machine interface control unit (HCU) illustrated in FIG. 1 to FIG. 3 is an interface control device used in a vehicle. The vehicle equipped with the HCU is also referred to as a host vehicle Am. The HCU 100 configures a human machine interface (HMI) system 10 of the host vehicle Am together with multiple input/output devices and the like. The HMI system 10 has an input interface function of receiving an operation made by an occupant, such as a driver of the host vehicle Am. The HMI system 10 has an output interface function of presenting information to the occupant, such as the driver.

The HCU 100 is communicably connected to a communication bus 99 of an in-vehicle network 1 equipped to the host vehicle Am. The HCU 100 is one of multiple nodes provided in the in-vehicle network 1. A driver monitor 29, a periphery monitoring sensor 30, a locator 35, a traveling control electronic control unit (ECU) 40, a driving assist ECU 50a, an autonomous driving ECU 50b, and the like are connected to the communication bus 99 of the in-vehicle network 1. These nodes connected to the communication bus 99 can communicate with one another. Specific nodes among these devices, ECUs, and the like may be directly electrically connected to one another and may communicate with one another without using the communication bus 99.

The driver monitor 29 includes a near-infrared light source, a near-infrared camera, and a control unit that controls these components. The driver monitor 29 is installed, for example, to an upper surface of a steering column, an upper surface of an instrument panel, or the like to have a posture such that the near-infrared camera is directed to a headrest of the driver's seat. The driver monitor 29 captures, using the near-infrared camera, an image of the head of the driver, which is irradiated with near-infrared light by the near-infrared light source. An image captured by the near-infrared camera is analyzed by the control unit. The control unit extracts information, such as the position of the eye point and the line-of-sight direction of the driver from the captured image. The driver monitor 29 provides, as driver status information, information indicating a state of the driver extracted by the control unit, to the HCU 100, the autonomous driving ECU 50*b*, or the like.

The periphery monitoring sensor 30 is an autonomous sensor that monitors the periphery environment of the host vehicle Am. The periphery monitoring sensor 30 includes, for example, at least one of a camera unit 31, a millimeter wave radar 32, a lidar 33, or a sonar 34. The periphery monitoring sensor 30 can detect a moving object or a stationary object from a detection range around the host vehicle. The periphery monitoring sensor 30 provides detection information of an object around the host vehicle to the driving assist ECU 50*a*, the autonomous driving ECU 50*b*, or the like.

The locator 35 includes a global navigation satellite system (GNSS) receiver, an inertial sensor, and the like. The locator 35 further includes a map database 36 that stores three-dimensional map data and two-dimensional map data. The locator 35 reads map data around the current position from the map database 36, and provides the map data as locator information to the driving assist ECU 50*a*, the autonomous driving ECU 50*b*, and the like together with the position information and the direction information of the host vehicle Am.

The traveling control ECU 40 is an electronic control unit mainly including a microcontroller. The traveling control ECU 40 has functions of a brake control ECU, a drive control ECU, and a steering control ECU. The traveling control ECU 40 may have other functions in addition to these functions. The traveling control ECU 40 continuously performs a braking force control for each wheel, an output control of vehicle-mounted traveling power source, and a steering angle control based on one of (i) an operation command based on driving operation of the driver, (ii) a control command of the driving assist ECU 50*a*, or (iii) a control command of the autonomous driving ECU 50*b*.

The driving assist ECU 50*a* and the autonomous driving ECU 50*b* constitute an autonomous driving system 50 of the host vehicle Am. By mounting the autonomous driving system 50, the host vehicle Am becomes an autonomous driving vehicle having an autonomous driving function and can travel by the autonomous driving function.

The driving assist ECU 50*a* implements a driving assist function for assisting the driving operation of the driver in the autonomous driving system 50. The driving assist ECU 50*a* enables advanced driving assistance or partial automated driving at about level 2 according to automated driving levels defined by the Society of Automotive Engineers of the United States. The autonomous driving performed by the driving assist ECU 50*a* is autonomous driving with periphery monitoring obligation, which requires monitoring of periphery of the host vehicle by visual observation of the driver.

The autonomous driving ECU 50*b* can substitute for the driving operation of the driver, and can perform autonomous driving of level 3 or higher in which the system is a control subject. The autonomous driving level refers to the level defined by the Society of Automotive Engineers of the United States. The autonomous driving performed by the autonomous driving ECU 50*b* does not require periphery monitoring of the host vehicle, that is, eyes-off autonomous driving without periphery monitoring obligation.

In the autonomous driving system 50 described above, the traveling control state of autonomous driving function can be switched among multiple traveling control states including at least the driving assist control with periphery monitoring obligation executed by the driving assist ECU 50*a* and the autonomous traveling control without periphery monitoring obligation executed by the autonomous driving ECU 50*b*. In the following description, the autonomous driving control of level 2 or lower by the driving assist ECU 50*a* is referred to as "driving assist control", and the autonomous driving control of level 3 or higher by the autonomous driving ECU 50*b* is referred to as "autonomous traveling control". In the autonomous driving period during which the host vehicle Am travels by the autonomous traveling control, the driver may be permitted to perform a specific action defined in advance (hereinafter referred to as a second task) other than driving operation. The second task is legally permitted to the driver until a request for performing driving operation by the autonomous driving ECU 50*b* and the HCU 100 in cooperation with one another, that is, a request for driving change occurs. For example, viewing of entertainment content such as video content, operation of a device such as a smartphone, or an action such as eating is assumed as the second task.

The driving assist ECU 50*a* is provided by a computer, which mainly includes a control circuit. The control circuit includes a processor, a RAM, a storage, an input/output interface, and a bus connecting these components. The driving assist ECU 50*a* implements driving assist functions, such as adaptive cruise control (ACC), lane trace control (LTC), and lane change assist (LCA) by executing programs with the processor. The driving assist ECU 50*a* performs the driving assist control for controlling the host vehicle Am to keep traveling along the currently traveling lane of host vehicle Am, by cooperation of functions of ACC and LTC. The driving assist ECU 50*a* uses the LCA function to change lane of the host vehicle Am from the currently traveling lane of host vehicle Am to another lane (hereinafter referred to as a destination lane) adjacent to the currently traveling lane of host vehicle.

The driving assist ECU 50*a* generates a planned traveling line extending from the current traveling lane of host vehicle to the adjacent lane in response to a driver's operation for instructing the execution of LCA (hereinafter, referred to as LCA activation operation) by referring to map data and the like. The adjacent lane is a movement destination lane of the lane change. For example, a driver operation of half-pressing a direction indication switch for a predetermined time (for example, about 1 to 3 seconds) in a state where the LTC is activated may correspond to the LCA activation operation. The driving assist ECU 50*a* temporarily interrupts the driving control of lane keep traveling by the LTC, performs the steering angle control according to the scheduled traveling line for the lane change in cooperation with the traveling control ECU 40, and executes the lane change from current traveling lane of the host vehicle to the adjacent lane. When the lane change is completed, the driving assist ECU 50*a* resumes the lane keep traveling by the LTC.

The driving assist ECU 50*a* provides control status information indicating a status of driving assist control to the autonomous driving ECU 50*b*. The control status information includes at least information indicating whether the operation state of LCA is an activation start state, a standby state, or an execution state. The activation start state is a state immediately after the LCA activation operation is received. In the activation start state, based on the detection information, existence of another vehicle in the adjacent lane is checked. Herein, the adjacent lane is the movement destination lane of the lane change. When the periphery check is completed, the operation state of LCA is set to either the standby state or the execution state. When a vehicle that may interrupt the lane change of host vehicle Am exists in the movement destination lane, the LCA is set to the standby state. When there is no other vehicle that may interrupt the lane change of host vehicle Am, the LCA is set to the execution state in which the lane change is actually started.

The autonomous driving ECU 50*b* has a higher calculation capability than the driving assist ECU 50*a*, and can perform at least traveling control corresponding to ACC, LTC, and LCA. The autonomous driving ECU 50*b* is provided by a computer, which mainly includes a control circuit. The control circuit includes a processor 51, a RAM 52, a storage 53, an input/output interface 54, and a bus connecting these components. The processor 51 executes various processes for implementing the autonomous driving control method of the present disclosure by accessing the RAM 52. The storage 53 stores various programs (such as an autonomous driving control program) to be executed by the processor 51. The autonomous driving ECU 50*b* includes, as functional units, an information cooperation unit 61, an environment recognition unit 62, an action determination unit 63, a control execution unit 64, and the like for implementing the autonomous driving function (see FIG. 2). Theses function units are implemented by execution of the program stored in the storage by the processor 51.

The information cooperation unit 61 provides information to an information cooperation unit 82 of the HCU 100, and acquires information from the information cooperation unit 82 of the HCU 100. The autonomous driving ECU 50*b* and the HCU 100 share information acquired by the autonomous driving ECU 50*b* and the HCU 100 through cooperation of respective information cooperation units 61 and 82. The information cooperation unit 61 generates control status information indicating the operation state of autonomous driving function, and provides the generated control status information to the information cooperation unit 82. The information cooperation unit 61 enables the HCU 100 to perform notification in synchronization with the operation state of autonomous driving function by outputting an execution request of notification to the information cooperation unit 82. The information cooperation unit 61 of the autonomous driving ECU 50*b* acquires the operation information, the driver estimation information, and the like from the information cooperation unit 82 of the HCU 100. The information cooperation unit 61 can grasp the driver operation input to the HMI system 10 or the like based on the operation information of driver. The information cooperation unit 61 can grasp a driving state of driver based on the driver estimation information.

The environment recognition unit 62 recognizes a traveling environment of host vehicle Am by combining locator information acquired by the locator 35 and detection information acquired by the periphery monitoring sensor 30. Specifically, the environment recognition unit 62 grasps information on a traveling road of the host vehicle Am, a relative position and a relative speed of a moving target (another vehicle or the like) existing around the host vehicle, and the like. The environment recognition unit 62 acquires vehicle information indicating the state of host vehicle Am from the communication bus 99. As an example, the environment recognition unit 62 acquires vehicle speed information indicating the current traveling speed of host vehicle Am.

The environment recognition unit 62 grasps traffic congestion around the host vehicle Am by combining information on other vehicles existing around the host vehicle, vehicle speed information, and the like. When the current traveling speed of host vehicle Am is equal to or lower than a congestion speed (for example, about 30 km/h) and both a preceding vehicle and a following vehicle travel in the current traveling lane of host vehicle, the environment recognition unit 62 determines that the periphery environment of the host vehicle is the congestion state.

The environment recognition unit 62 determines whether a current traveling road of the host vehicle Am a planned traveling road of the host vehicle Am scheduled to travel is a preset autonomous driving possible area (hereinafter, referred to as an AD area). In the AD area, traveling using the autonomous driving function is permitted. An expressway, a motorway, or the like may correspond to the AD area. The environment recognition unit 62 determines a road not included in the AD area as a manual driving area (hereinafter, referred to as a MD area). In the MD area, traveling using the autonomous driving function is not permitted. In the MD area, execution of autonomous driving (driving assist control) of level 2 or higher is prohibited. The manual driving corresponds to the autonomous driving of level 0.

The action determination unit 63 cooperates with the driving assist ECU 50*a* and the HCU 100 to control a change of driving operation between the autonomous driving system 50 and the driver. When the autonomous driving system 50 has the control right of driving operation, the action determination unit 63 generates a planned traveling line along which the host vehicle Am travels based on the recognition result of the traveling environment recognized by the environment recognition unit 62, and outputs the generated planned traveling line to the control execution unit 64. The action determination unit 63 includes an assist control grasping unit 76 and a control switching unit 77 as subfunctional units for controlling the operation state of autonomous driving function.

The assist control grasping unit 76 acquires the control status information from the driving assist ECU 50*a*. The assist control grasping unit 76 grasps an operation state of LCA, in other words, an execution state of lane change by the driving assist control, based on the acquired control status information.

The control switching unit 77 cooperates with the driving assist ECU 50*a* to control start and end of driving assist control in which the driver is obligated to monitor the periphery. The control switching unit 77 cooperates with the driving assist ECU 50*a* to switch between the driving assist control in which the driver is obliged to monitor the periphery and the autonomous traveling control in which the driver is not obliged to monitor the periphery. Multiple switch conditions (hereinafter referred to as level 3 start condition) for permitting switch to the autonomous traveling control are set in the control switching unit 77. The level 3 start condition includes a requirement relating to the driver of the host vehicle Am, a requirement relating to the traveling state of host vehicle Am, a requirement relating to the traveling environment around the host vehicle, and the like. For example, traveling in an AD area, recognition of traffic congestion around the host vehicle, and the like may be set as the level 3 start conditions. The control switching unit 77 determines whether a switch from the driving assist control in which the driver is obliged to monitor the periphery to the autonomous traveling control in which the driver is not obliged to monitor the periphery is possible based on whether partial or all of the multiple level 3 start conditions are satisfied.

When the autonomous driving ECU 50*b* has the control right of driving operation, the control execution unit 64 executes, in cooperation with the traveling control ECU 40, acceleration/deceleration control, steering control, and the like of the host vehicle Am according to the planned traveling line generated by the action determination unit 63.

The control execution unit 64 generates a control command based on the planned traveling line and sequentially outputs the generated control command to the traveling control ECU 40.

The following will describe, in order, details of the multiple display devices, the audio device 24, the ambient light 25, the operation device 26, and the HCU 100 included in the HMI system 10.

The display devices present information to the driver's visual sensation by display of image or the like. The display devices include a meter display 21, a center information display (hereinafter referred to as CID) 22, a head-up display (hereinafter referred to as HUD) 23, and the like. The CID 22 has a function of touch panel, and detects a touch operation made by a driver on a display screen.

The audio device 24 has multiple speakers installed in the vehicle compartment around the driver's seat, and controls the speakers to reproduce a notification sound, a voice message, or the like in the vehicle compartment. The ambient light 25 is provided on an instrument panel, a steering wheel, or the like. The ambient light 25 performs information presentation using a peripheral visual field of the driver by ambient display in which an emission color of the light is changed.

The operation device 26 is an input unit that receives a user operation (driver operation) made by a driver or the like. For example, the operation device 26 receives a user operation related to activation and deactivation of autonomous driving function. As another example, the operation device 26 receives a driver operation (hereinafter, referred to as level 2 switch operation) for instructing the start of driving assist control, a driver operation (hereinafter, referred to as level 3 switch operation) for instructing the switch from driving assist control to autonomous traveling control, and the like. The operation device 26 includes a steering switch located on a spoke portion of a steering wheel, an operation lever located on a steering column portion, a voice input device that recognizes a content of driver's voice, and the like.

The HCU 100 is an information presentation device that integrally controls information presentation using the multiple display devices, the audio device 24, and the ambient light 25. The HCU 100 controls presentation of information related to autonomous driving in cooperation with the autonomous driving system 50. The HCU 100 is provided by a computer, which mainly includes a control circuit. The control circuit includes a processor 11, a RAM 12, a storage 13, an input/output interface 14, and a bus connecting these components. The processor 11 executes a presentation control process by accessing to the RAM 12. The RAM 12 may include a video RAM for generating video data. The storage 13 includes a non-volatile storage medium. The storage 13 stores various programs (such as a presentation control program) to be executed by the processor 11. The HCU 100 constructs multiple functional units by controlling the processor 11 to execute programs stored in the storage 13. The HCU 100 includes, as functional units, an information acquiring unit 81, an information cooperation unit 82, a driver status grasping unit 86, and a presentation control unit 88 (see FIG. 3).

The information acquiring unit 81 acquires vehicle information (for example, vehicle speed information) indicating the state of host vehicle Am from the communication bus 99. The information acquiring unit 81 acquires operation information indicating the content of user operation from the CID 22, the operation device 26, and the like.

The information cooperation unit 82 cooperates with the autonomous driving ECU 50b to enable sharing of information between the autonomous driving system 50 and the HCU 100. The information cooperation unit 82 provides, to the autonomous driving ECU 50b, the operation information grasped by the information acquiring unit 81, the driver estimation information estimated by the driver status grasping unit 86, and the like. The information cooperation unit 82 acquires, from the autonomous driving ECU 50b, an execution request for information presentation related to the autonomous driving function and control status information indicating the status of autonomous driving function.

The information cooperation unit 82 grasps the operation state of autonomous driving executed by the autonomous driving system 50 based on the control status information. Specifically, the information cooperation unit 82 determines whether the traveling control being executed is the driving assist control or the autonomous running control, that is, determines whether the driver is obligated to monitor the periphery. When the host vehicle Am is determined to be traveling in a state where the driver is obligated to monitor the periphery, the information cooperation unit 82 determines whether or not a lane change by the LCA function is being executed. The information cooperation unit 82 determines whether or not a switch from the driving assist control in which the driver is obligated to monitor the periphery to the autonomous traveling control in which the driver is not obligated to monitor the periphery is possible. Even in a control period (hereinafter, referred to as LC control period) of the lane change by the function of LCA, the information cooperation unit 82 continues to grasp whether or not the switch to the autonomous traveling control is possible.

The driver status grasping unit 86 acquires driver status information from the driver monitor 29. The driver status grasping unit 86 grasps, based on the driver status information, a gripping state of the steering wheel by the driver, an execution state of periphery monitoring by the driver, a content of second task operated by the driver, and the like. The estimation result of the driver status grasped by the driver status grasping unit 86 is provided to the presentation control unit 88, the autonomous driving ECU 50b, and the like as driver estimation information.

The presentation control unit 88 integrally provides information to the driver using each display device, the audio device 24, and the ambient light 25 (hereinafter, referred to as information presentation device). The presentation control unit 88 performs content provision and information presentation in accordance with the operation state of autonomous driving based on the control status information and the execution request acquired by the information cooperation unit 82, the driver estimation information grasped by the driver status grasping unit 86, and the like.

Figure 4:
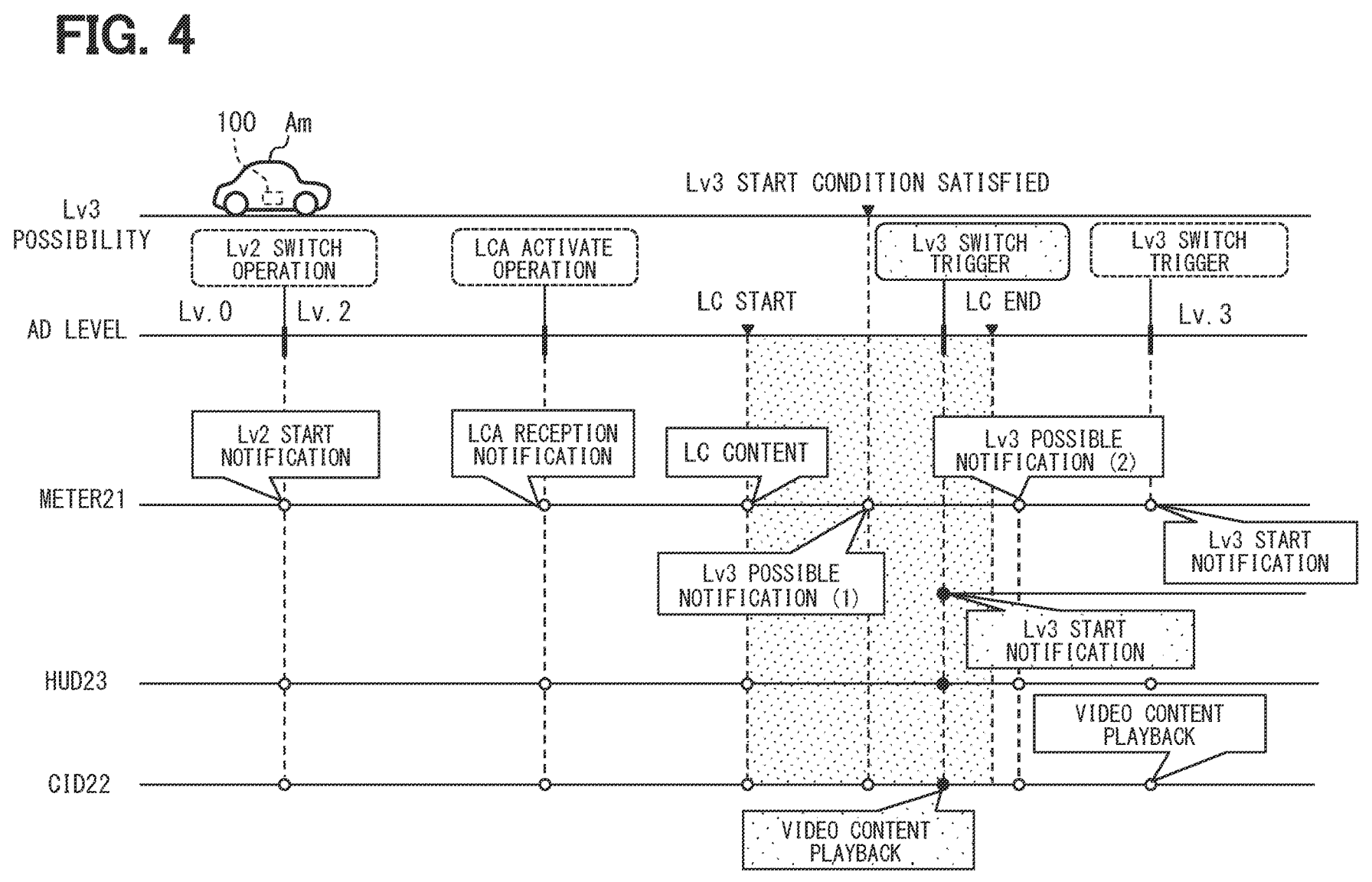
Figure 5:
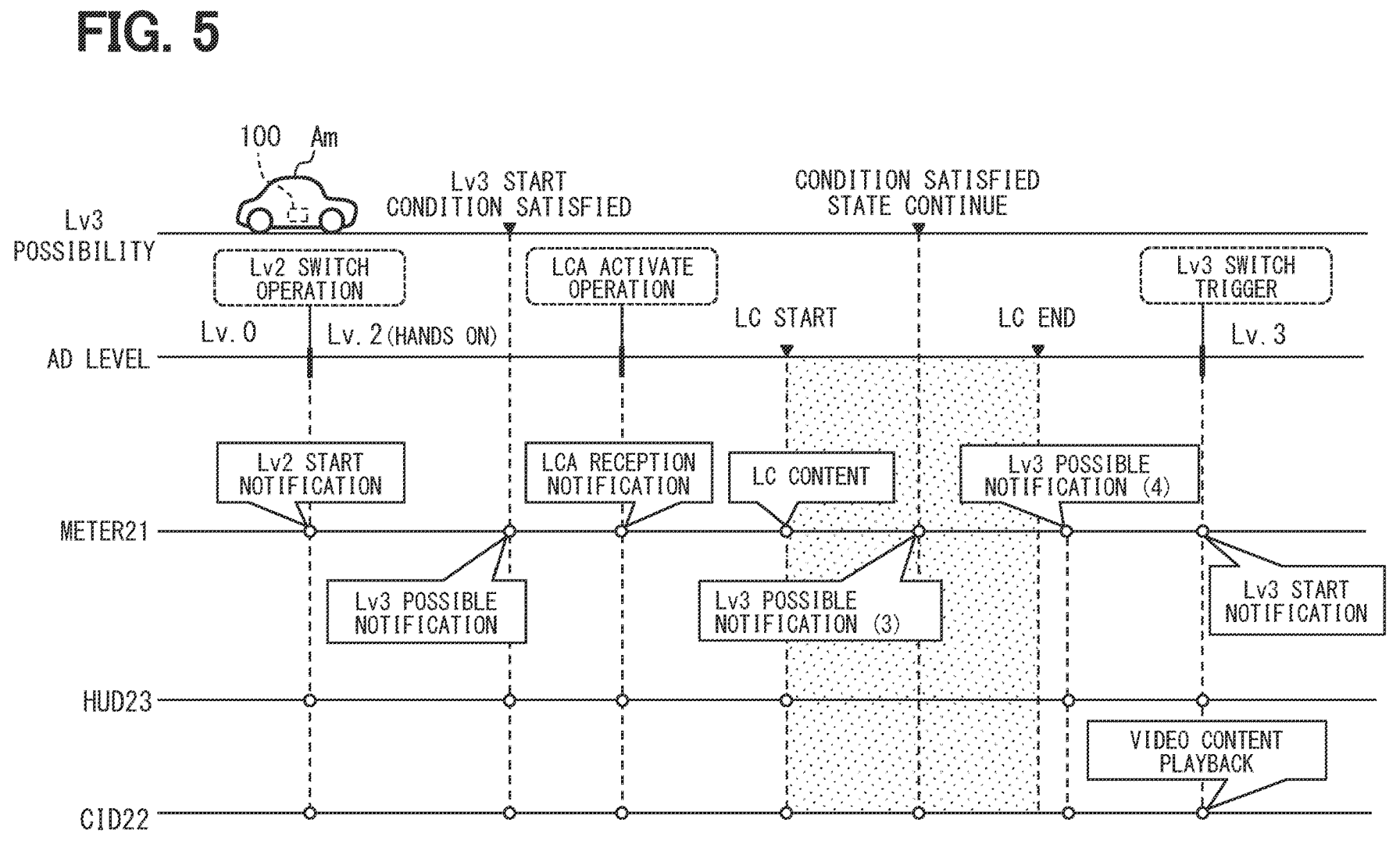

The presentation control unit 88 controls each display device to display the level 2 start notification indicating the start of driving assist control, the LCA reception notification indicating that the LCA activation operation is received, the LCA content indicating the operation state of LCA, and the like (see FIG. 4 and FIG. 5). The presentation control unit 88 presents a switch possible notification (hereinafter, referred to as level 3 possible notification) indicating that the switch to autonomous traveling control is possible and a switch start notification (hereinafter, referred to as level 3 start notification) indicating that the autonomous traveling control is started.

In the autonomous driving system 50 described above, it is assumed that the lane change by the autonomous traveling control and the switch to autonomous traveling control during execution of lane change with LCA are permitted or prohibited based on regulations of a country or a region in which the vehicle is used. In the autonomous driving system 50 of the present disclosure, it is assumed that both the lane change by the autonomous traveling control and the switch to autonomous traveling control during the lane change by the LCA are permitted. In the host vehicle Am equipped with such an autonomous driving system 50, the LC control period in which the lane change is being performed by the function of LCA may overlap with a time at which a switch to the autonomous traveling control becomes possible. Hereinafter, vehicle control and information presentation performed in such a scene will be described in detail with accompanying FIG. 4 and FIG. 5, by referring to FIG. 1 to FIG. 3 as necessary.

In the scene illustrated in FIG. 4, the host vehicle Am travels by the driving assist control, and the lane change by the LCA function is executed based on the LCA activation operation made by the driver. In the autonomous driving ECU 50*b*, the control switching unit 77 continues to determine whether a switch from the driving assist control to the autonomous traveling control is possible even in the LC control period (see the dotted range in FIG. 4) during which the lane change by the LCA function being executed. In some cases, the level 3 start condition may be satisfied in the LC control period. For example, in a case where the vehicle enters the AD area during the execution of lane change by the LCA, in a case where congestion occurs in a movement destination lane (an overtaking lane, a merging lane, or the like), in a case where the vehicle enters the AD area while the LCA is in a standby state, a switch to the autonomous traveling control can be performed even during the LC control period.

When a switch to the autonomous traveling control is possible during the LC control period, the presentation control unit 88 performs the level 3 possible notification within the LC control period. That is, the driver is notified during the LC control period that a switch to the autonomous driving without periphery monitoring obligation is possible. Alternatively, when the driver monitors the periphery in association with the lane change during the LC control period, the presentation control unit 88 may suspend the execution of the level 3 possible notification.

Figure 6:
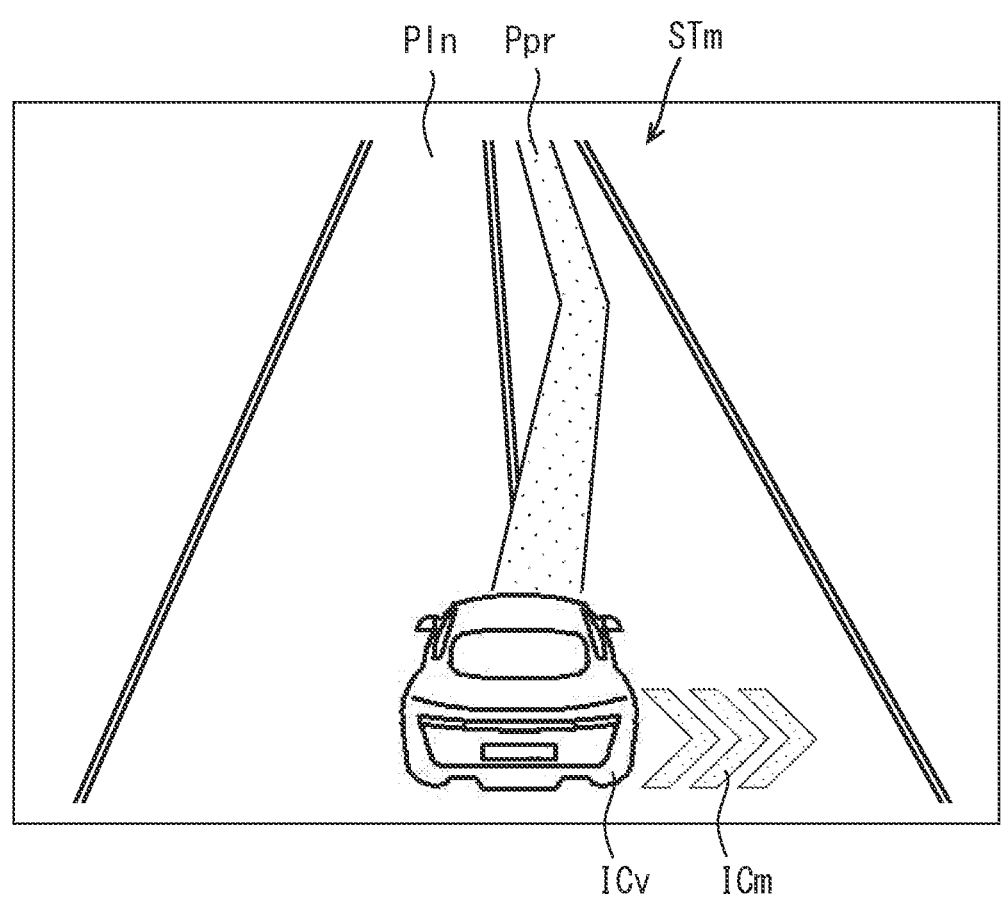
FIG. 6 is a diagram showing an example of a level 3 possible notification displayed on a meter display.

The presentation control unit 88 controls the meter display 21, the CID 22, and the like to display, for example, a message such as "second task becomes available" as the level 3 possible notification during the LC control period. The presentation control unit 88 does not use the HUD 23 for the level 3 possible notification. The presentation control unit 88 may change a mode of control status STm (see FIG. 6) displayed on the meter display 21 or the like as the level 3 possible notification during the LC control period.

The control status STm is an image content for presenting the operation state of autonomous driving function. The control status STm includes a lane background Pln, a host vehicle icon ICv, a planned traveling Ppr, an LC icon ICm, and the like. The lane background Pln indicates a lane of the road on which the host vehicle Am is traveling. The host vehicle icon ICv indicates a relative position of the host vehicle Am with respect to each lane drawn in the lane background Pln. The planned traveling Ppr indicates a planned traveling line of the host vehicle Am generated by the autonomous driving system 50. The LC icon ICm indicates a moving direction of the host vehicle Am in the lane change by the LCA.

The presentation control unit 88 changes a display mode of the scheduled traveling trajectory Ppr to be displayed in the control status STm as the level 3 possible notification, which is output during the LC control period. As an example, when green and blue display colors are associated in advance with the driving assist control and the autonomous traveling control, respectively, the presentation control unit 88 changes the display color of the planned traveling trajectory Ppr from green to blue as the level 3 possible notification. The level 3 possible notification may be performed by changing a display color of a boundary line of lane or a color of lane drawn in the lane background Pln. The level 3 possible notification may be performed by changing an emission color emitted from the ambient light 25.

After the level 3 start condition is satisfied, the control switching unit 77 determines existence of a trigger (hereinafter, referred to as a level 3 switch trigger) for executing switch to the autonomous traveling control. The level 3 switch trigger may be an input of a level 3 switch operation made by the driver, or may be a start determination by the action determination unit 63. When the level 3 switch trigger is satisfied before the LC control period ends, the control switching unit 77 performs switch from the driving assist control to the autonomous traveling control during the LC control period.

The presentation control unit 88 performs the level 3 start notification in accordance with the control switch executed during the LC control period. As the level 3 start notification, the presentation control unit 88 controls each display device to display, for example, a message such as "Please pay attention to information from the vehicle. Autonomous driving will be canceled due to periphery road conditions". The presentation control unit 88 enables the CID 22 to reproduce a video content or the like in accordance with the execution of level 3 start notification.

Even when the level 3 switch trigger is satisfied before the end of LC control period, the control switching unit 77 may suspend a switch to the autonomous traveling control until end of the lane change assisted by the LCA function. In this case, the presentation control unit 88 performs the level 3 start notification in accordance with the control switch after the end of lane change.

In a case where the level 3 switch trigger is not satisfied during the LC control period, the presentation control unit 88 performs the level 3 possible notification even after the LC control period ends on condition that the state in which a switch from the driving assist control to the autonomous traveling control is possible continues. A mode of the level 3 possible notification (hereinafter referred to as a second switch possible notification) performed after the end of LC control period is different from a mode of the level 3 possible notification (hereinafter referred to as a first switch possible notification) performed during the LC control period.

The second switch possible notification is more attractive (more conspicuous) than the first switch possible notification. As an example, the presentation control unit 88 may us the HUD 23 for the second switch possible notification, but does not use the HUD 23 for the first switch possible notification. As another example, the presentation control unit 88 makes a size of message image displayed in the second switch possible notification larger than a size of message image displayed in the first switch possible notification. The presentation control unit 88 presents the second switch possible notification so that the second switch possible notification is more easily perceived by the driver than the first switch possible notification by differentiating a display color, a display size, a display brightness, presence or absence of animation effect and blinking effect, or the like. In the second switch possible notification, a voice message that is not output in the first switch possible notification may be output.

When the level 3 switch trigger is determined to be satisfied by the control switching unit 77 after the start of second switch possible notification, the presentation control unit 88 performs the level 3 start notification in accordance with the control switch to the autonomous traveling control. In this case, the presentation control unit 88 controls each display device to display a message indicating that the autonomous traveling control is started.

In the scene illustrated in FIG. 5, after a switch to the autonomous traveling control becomes possible in response to satisfaction of the level 3 start condition, the driver inputs an LCA activation operation before execution of switch to the autonomous traveling control. When the driver inputs the LCA activation operation, since there is a possibility that the recognition of traveling environment of the movement destination lane is not sufficient, the control switching unit 77 suspends the switch to the autonomous traveling control without periphery monitoring obligation and selects the execution of lane change by the function of LCA with the periphery monitoring obligation.

The control switching unit 77 continues to determine whether or not the switch from the driving assist control to the autonomous traveling control is possible even in the LC control period (see the dotted range in FIG. 5) during which the lane change by the function of the LCA is executed. In some cases, the level 3 start condition may be satisfied during the LC control period. In this case, the control switching unit 77 performs the switch to the autonomous traveling control in response to the level 3 switch trigger during the LC control period or after end of the LC control period.

The presentation control unit 88 performs the level 3 possible notification (hereinafter, referred to as a normal switch possible notification) based on the first time satisfaction of level 3 start condition in the current traveling lane of host vehicle. When the presentation control unit 88 grasps that a satisfied state of level 3 start condition continues during the LC control period, the presentation control unit 88 performs the level 3 possible notification (hereinafter referred to as a third switch possible notification) during the LC control period. In a case where the level 3 switch trigger exists during the LC control period, the presentation control unit 88 performs the level 3 start notification during the LC control period or after the end of LC control period.

In a case where level 3 switch trigger does not exist during the LC control period, the presentation control unit 88 performs the level 3 possible notification (hereinafter, a fourth switch possible notification) after the LC control period ends. When the level 3 switch trigger is detected by the control switching unit 77 after the start of fourth switch possible notification, the presentation control unit 88 performs the level 3 start notification in accordance with the control switch to the autonomous traveling control.

The fourth switch possible notification may be more attractive than the third switch possible notification. As an example, in the fourth switch possible notification, substantially the same content as that of the second switch possible notification and the normal switch possible notification performed first time may be displayed. In the fourth switch possible notification, information presentation by output of a voice message, which is not performed in the normal switch possible notification, may be performed. In the third switch possible notification, content with reduced attractiveness may be displayed substantially in the same manner as in the first switch possible notification described above. In the third switch possible notification, an output of the voice message is not performed. Similar to the first switch possible notification described above, the execution third switch possible notification may be suspended when the driver is monitoring the periphery of host vehicle in association with the lane change.

The following will describe details of processes for implementing the autonomous driving control and an information presentation control described above based on FIG. 7 to FIG. 9, by referring to FIG. 1 to FIG. 6 as necessary.

Figure 7:
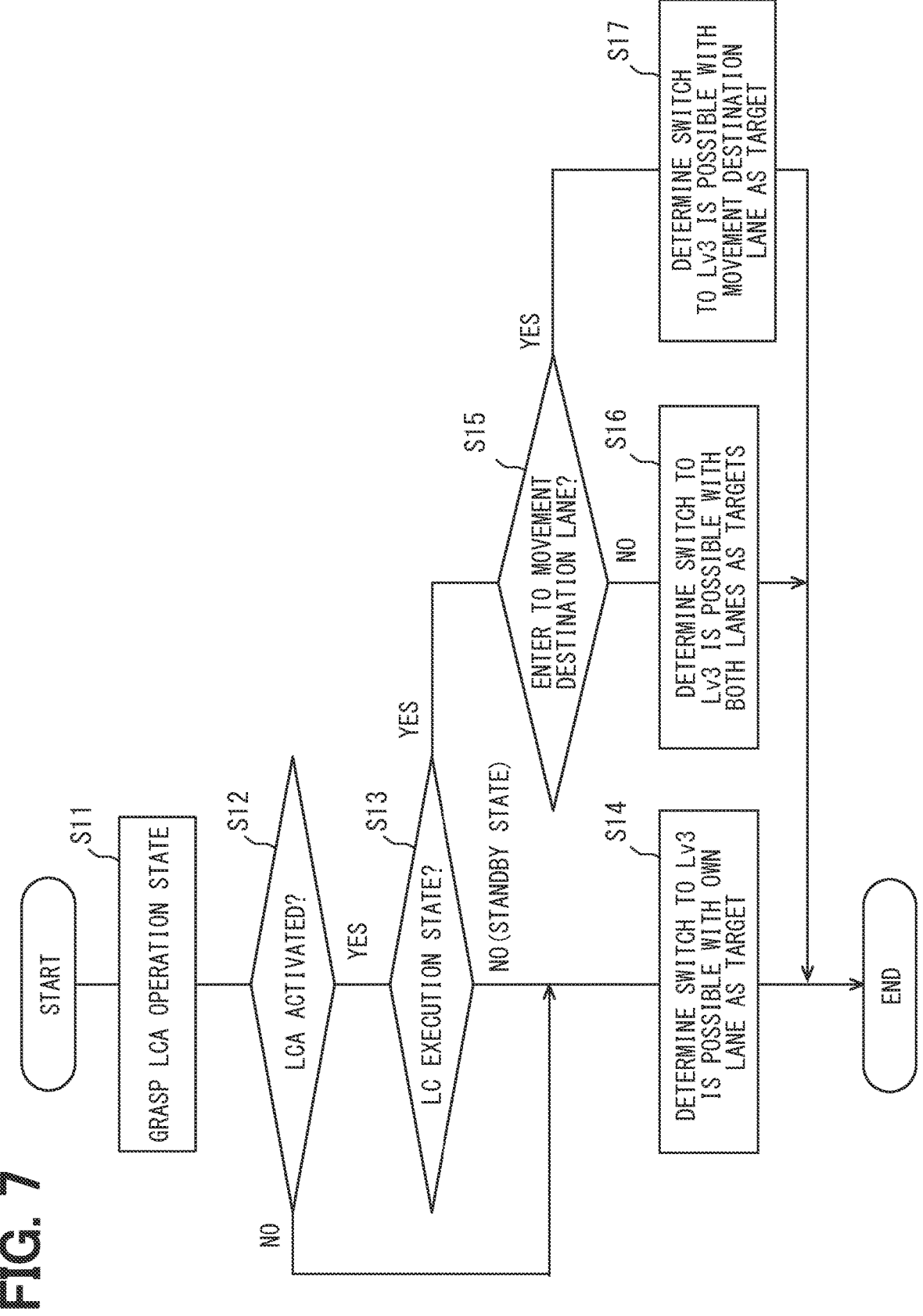
FIG. 7 is a flowchart showing details of a determination target switching process.

The action determination unit 63 of the autonomous driving ECU 50b starts a determination target switching process illustrated in FIG. 7 based on a start of the driving assist control. The determination target switching process is repeatedly executed until the driving assist control ends. Based on the determination target switching process, the autonomous driving ECU50b switches, in the LC control period, a determination target lane for which it is determined whether a switch to the autonomous traveling control is possible, from the current traveling lane of host vehicle before movement of the lane change to the movement destination lane to which the host vehicle plans to move by the lane change.

The determination target switching process grasps, in S11, an execution state of the lane change performed by the driving assist control with the periphery monitoring obligation, that is, an operation state of LCA based on the control status information acquired from the driving assist ECU 50a, and proceeds to S12. In S12, the process determines whether the LCA is activated. When the process determines in S12 that the LCA is not activated, the process proceeds to S14. When the process determines in S12 that the LCA is activated, the process proceeds to S13.

In S13, the process determines whether the lane change by the LCA is being executed. When the process determines in S13 that the LCA is in the activation start state or the standby state and is not in the execution state, the process proceeds to S14. In S14, the current traveling lane of host vehicle is set as a determination target. Then, the process starts determination of whether or not a switch from the driving assist control to the autonomous traveling control is possible in the current traveling lane of host vehicle lane, and the current cycle of determination target switching process is ended.

When the process determines i S13 that the LC is in the execution state, the process proceeds to S15. In S15, the process determines whether or not the host vehicle Am has entered the switch destination lane based on the current position of the host vehicle Am. As an example, when a part or the center of gravity of the host vehicle Am crosses a boundary line between lanes, it may be determined that the host vehicle Am has entered the movement destination lane. When the process determines in S15 that the host vehicle Am has not yet entered the movement destination lane, the process proceeds to S16. In S16, both the host vehicle lane and the movement destination lane are set as determination targets. Then, for both the current traveling lane of host vehicle and the movement destination lane, the determination of whether or not a switch from the driving assist control to the autonomous traveling control is possible is started, and the current cycle of determination target switching process is ended.

When the process determines in S15 that the host vehicle Am has entered the movement destination lane, the process proceeds to S17. In S17, the movement destination lane is set as a determination target. Then, the process starts to determine whether or not a switch from the driving assist control to the autonomous traveling control is possible in the movement destination lane, and then the current cycle of determination target switching process is ended. According to S16 and S17 described above, the determination of whether or not the switch from the driving assist control to the autonomous traveling control is possible is continued even in the LC control period during which the lane change by the LCA is being executed.

Figure 8:
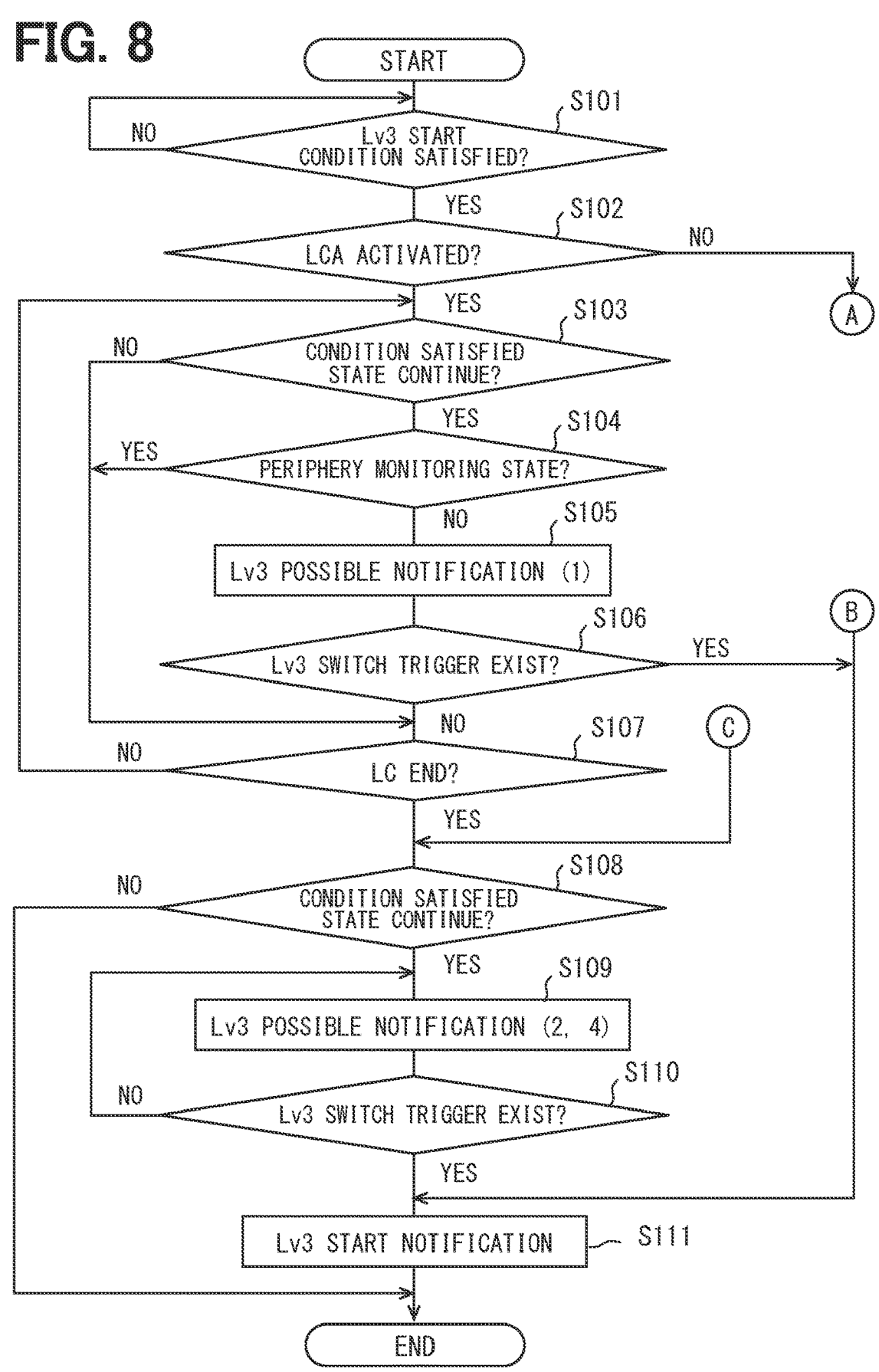
FIG. 8 is a flowchart showing details of level 3 switch guidance process together with FIG. 9.
Figure 9:
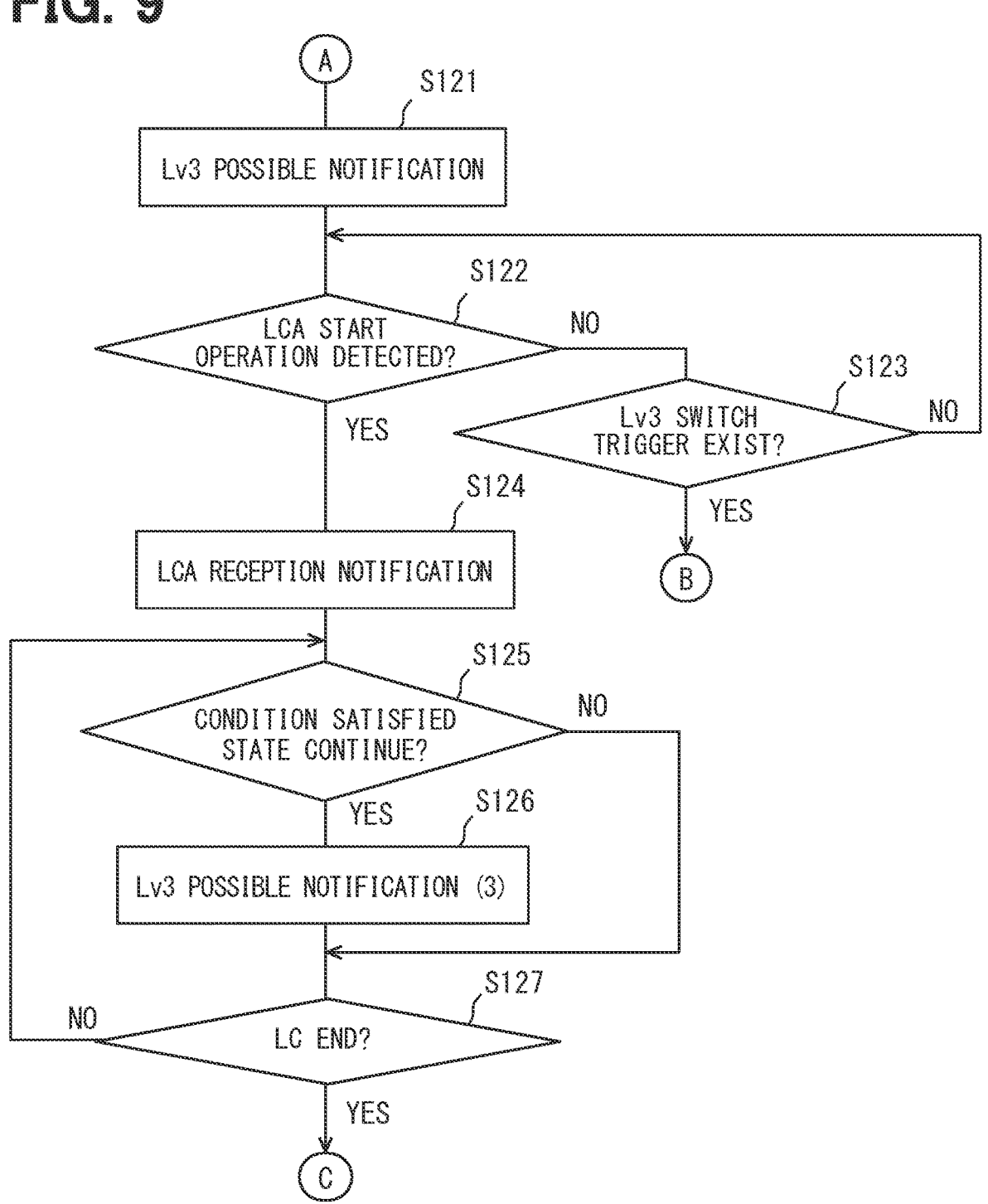
FIG. 9 is a flowchart showing details of level 3 switch guidance process together with FIG. 8.

The HCU 100 starts a level 3 switch guidance process illustrated in FIG. 8 and FIG. 9 in response to a start of the driving assist control. The HCU 100 sequentially performs the level 3 possible notification once or multiple times and the level 3 start notification according to the level 3 switch guidance process.

In S101 of level 3 switch guidance process, the information cooperation unit 82 determines whether the switch from the driving assist control to the autonomous traveling control is possible. In S101, in response to determining that the switch to autonomous traveling control is possible based on the satisfaction of level 3 start condition, the process proceeds to S102. In S102, the information cooperation unit 82 determines the operation state of LCA, specifically, whether the lane change by the LCA function is being executed. In S102, in response to determining that the LCA is activated and the lane change is being executed, the process proceeds to S103 (see FIG. 4).

In S103, the information cooperation unit 82 determines whether the level 3 start condition is satisfied with the movement destination lane of lane change as a main determination target. In S103, in response to determining that the switch to the autonomous traveling control in the movement destination lane is not possible, the process proceeds to S107. In S103, in response to determining that the switch to the autonomous traveling control in the movement destination lane is possible, the process proceeds to S104.

In S104, the driver status grasping unit 86 grasps the status of periphery monitoring performed by the driver. In S104, in response to determining that the line of sight of the driver is directed to the movement destination lane and the driver is monitoring the periphery for the lane change, the process proceeds to S107. In S104, when it is determined that the line of sight of the driver is directed to a position (for example, a display device or the like) different from the movement destination lane and the periphery monitoring associated with the lane change is not performed by the driver, the process proceeds to S105. In S105, the presentation control unit 88 performs the level 3 possible notification (first switch possible notification) indicating that the switch to the autonomous traveling control is possible in a suppressed visual attraction mode, and the process proceeds to S106.

In S106, the information cooperation unit 82 determines whether the level 3 switch trigger exists. In S106, in response to determining existence of level 3 switch trigger, the process proceeds to S111. In S106, in response to determining absence of level 3 switch trigger, the process proceeds to S107.

In S107, the information cooperation unit 82 determines whether the lane change by the LCA is ended. In S107, in response to determining that the lane change has not yet been completed, the process repeats S103 to S106. In S107, in response to determining that the lane change by the LCA has ended, the process proceeds to S108.

In S108, the information cooperation unit 82 determines whether the level 3 start condition is satisfied with the movement destination lane of lane change, similar to S103. In S108, in response to determining that the switch to the autonomous traveling control in the movement destination lane is not possible, the level 3 switch guidance process is ended. In S108, in response to determining that the switch to the autonomous traveling control is possible even in the movement destination lane, the process proceeds to S109.

In S109, the presentation control unit 88 performs the level 3 possible notification (second switch possible notification) indicating that the switch to the autonomous traveling control is possible, and the process proceeds to S110. The second switch possible notification performed in S109 is more noticeable to the driver than the first switch possible notification performed in S105.

In S110, the information cooperation unit 82 determines whether the level 3 switch trigger exists, similarly to S106. In S110, in response to determining that the level 3 switch trigger does not exist, the process returns to S109, and the level 3 possible notification is continued. In S110, in response to determining that the level 3 switch trigger exists, the process proceeds to S111. In S111, the presentation control unit 88 performs level 3 start notification indicating the start of autonomous traveling control, and ends the level 3 switch guidance process.

In above-described S102, in response to determining that the LCA is not in activated state, the process proceeds to S121 (see FIG. 5). In S121, the presentation control unit 88 performs the level 3 possible notification, similarly to S105 and S109, and the process proceeds to S122. In S122, which is executed after the level 3 possible notification is started, the information acquiring unit 81 determines a presence or absence of LCA activation operation input by the driver. In S122, the process determines whether the lane change by the LCA function to be started before the switch to the autonomous traveling control.

In S122, in response to determining that the LCA activation operation is not detected, the process proceeds to S123. In S123, the information cooperation unit 82 determines whether the level 3 switch trigger exists, similarly to S106. In S123, in response to determining that the level 3 switch trigger does not exist, the process returns to S122. In S123, in response to determining that the level 3 switch trigger exists, the level 3 start notification is performed in S111, and the level 3 switch guidance process is ended.

In S122, in response to determining that the LCA activation operation is detected, the process proceeds to S124. In S124, the presentation control unit 88 performs an LCA reception notification, and the process proceeds to S125. In S125, the information cooperation unit 82 determines whether the level 3 start condition is satisfied with the movement destination lane as a determination target, similarly to S103. In S125, in response to determining that the switch to the autonomous traveling control in the movement destination lane is not possible, the process proceeds to S127. In S125, in response to determining that the switch to the autonomous traveling control is possible even in the movement destination lane, the process proceeds to S126.

In S126, the presentation control unit 88 performs the level 3 possible notification (third switch possible notification) in a mode with low visual attraction, similarly to S105, and the process proceeds to S127. In S127, the information cooperation unit 82 determines whether the lane change by the LCA has ended, similarly to S107. In S127, in response to determining that the lane change has not been ended, the process repeats S125, S126, and S127. In S127, in response to determining that the lane change by the LCA has ended, the process proceeds to S108.

In S108 and S109 after execution of S125 to S127, when the state in which the switch to the autonomous traveling control is possible continues, the level 3 possible notification (fourth switch possible notification) is performed. Then, in S110 and S111, the level 3 start notification is performed based on the existence of level 3 switch trigger, and the level 3 switch guidance process is ended.

In the first embodiment described above, when the switch to the autonomous traveling control becomes possible in the LC control period in which the lane change by the driving assist control of LCA is being performed, the level 3 possible notification is output during the LC control period to notify that the switch to the autonomous traveling control becomes possible. As a result, a time for recognizing that the switch to the autonomous traveling control becomes possible can be secured. Thus, the driver can smoothly start the autonomous driving without periphery monitoring obligation. Thus, it is possible to ensure the convenience of autonomous driving without periphery monitoring obligation.

In the first embodiment, during the LC control period or after the LC control period ends, when the driving assist control is to be switched to the autonomous traveling control, the level 3 start notification indicating the start of autonomous traveling control is performed. As described above, when the level 3 possible notification and the level 3 start notification are sequentially performed, the switch to the autonomous driving without periphery monitoring obligation performed by the autonomous driving system 50 can be notified to the driver in an easily understandable manner.

In the first embodiment, when the state in which the switch from the driving assist control to the autonomous traveling control is possible continues after the lane change by the LCA ends, the level 3 possible notification (second switch possible notification) is performed even after the LC control period ends. Therefore, even when the driver overlooks the level 3 possible notification (the first switch possible notification) presented during the lane change, the driver can be notified that the switch to the autonomous traveling control is possible after the completion of lane change. As a result, the driver can appropriately start to use the autonomous traveling control. Therefore, the convenience of autonomous driving can be further improved.

In the first embodiment, the mode of first switch possible notification performed during the LC control period is different from the mode of second switch possible notification performed after the LC control period ends. Therefore, the attractiveness of the notification can be adjusted in accordance with different presentation timings. As a result, it is possible to notify the driver that the autonomous traveling control can be used in an easily understandable manner while suppressing the inconvenience of notification.

In the first embodiment, in a case where the driver monitors the periphery for lane change in the LC control period, the execution of level 3 possible notification is suspended. Therefore, it is possible to avoid a situation in which the level 3 possible notification interrupts the driver from monitoring the periphery and makes the driver feel annoyed. When the suspended level 3 possible notification is appropriately resumed, the driver can appropriately recognize that the switch to the autonomous traveling control is possible.

In the first embodiment, in a case where the lane change by the LCA is started after the level 3 possible notification is performed and before the actual switch to the autonomous traveling control, the level 3 possible notification (fourth switch possible notification) is performed again after the lane change is completed on the condition that the switch to the autonomous traveling control is possible even after the lane change is completed. According to the execution of level 3 possible notification (fourth switch possible notification), even when the lane in which the host vehicle Am travels has changed, the driver can be notified whether the state in which the switch to autonomous traveling control is possible is continued in an easily understandable manner. As a result, even when the lane change is performed, the autonomous driving without periphery monitoring obligation can be smoothly started. Thus, it is possible to ensure the convenience of autonomous driving without periphery monitoring obligation.

In the first embodiment, when it is determined in the LC period, that the switch to the autonomous traveling control is possible after the end of lane change, the level 3 possible notification (third switch possible notification) is performed during the LC control period. Therefore, the driver can start to use the autonomous driving without periphery monitoring obligation in early stage. As a result, it is possible to improve the convenience of autonomous driving without periphery monitoring obligation.

In the first embodiment, the system continues to determine whether switch from the driving assist control with the periphery monitoring obligation to the autonomous traveling control without periphery monitoring obligation is possible during the LC control period in which the lane change is being executed by the driving assist control. Therefore, even during the LC control period, it can be determined that the switch to the autonomous traveling control is possible. Thus, the vehicle can switch to the autonomous traveling control without periphery monitoring obligation in early stage. As a result, it is possible to improve the convenience of autonomous driving without periphery monitoring obligation.

In the above embodiment, the control switching unit 77 corresponds to a switch determination unit, the information cooperation unit 82 corresponds to a traveling control grasping unit, and the presentation control unit 88 corresponds to a notification control unit. The autonomous driving ECU 50b corresponds to an autonomous driving control device, and the HCU 100 corresponds to a presentation control device.

Second Embodiment

Figure 10:
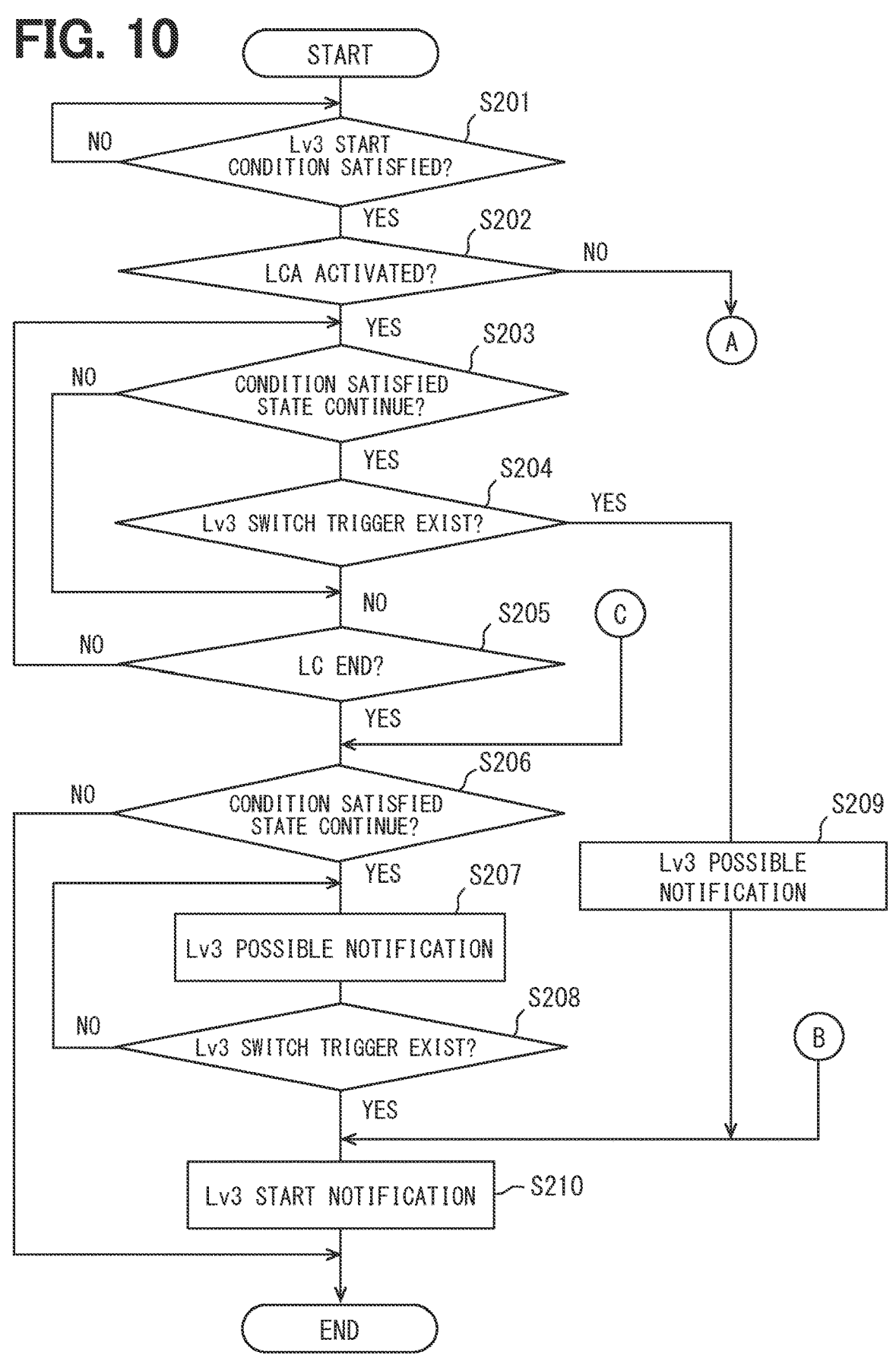
FIG. 10 is a flowchart showing details of level 3 switch guidance process according to a second embodiment of the present disclosure together with FIG. 9.

The second embodiment of the present disclosure is a modification of the first embodiment. The presentation control unit 88 of the second embodiment (see FIG. 3) suspends the execution of level 3 possible notification during the LC control period when the switch to autonomous traveling control becomes possible in the LC control period in which the lane change is being performed by the LCA function. The presentation control unit 88 performs the level 3 possible notification after the LC control period ends. Hereinafter, the level 3 switch guidance process of the second embodiment will be described in detail with reference to FIG. 10. In the second embodiment, when the LCA function is activated immediately after the switch to the autonomous traveling control becomes possible (see FIG. 5), the process executes S121 to S127 (see FIG. 9) in the substantially same manner as those of the first embodiment.

In S201 and S202, similarly to the first embodiment (see FIG. 8), the process sequentially determines whether the switch to the autonomous traveling control becomes possible and whether the LCA function is activated. When it is determined in S202 that the LCA is not yet activated, the process proceeds to S121 (see FIG. 9).

In S203, the process determines whether the level 3 start condition is satisfied with the movement destination lane as a determination target. In S203, in response to determining that the switch to the autonomous traveling control in the movement destination lane is not possible, the process proceeds to S205. In S203, in response to determining that the switch to the autonomous traveling control in the movement destination lane is possible, the process proceeds to S204.

In S204, the process determines whether the level 3 switch trigger exists. In S204, in response to determining that the level 3 switch trigger exists, the level 3 possible notification and the level 3 start notification are sequentially performed in S209 and S210, and the level 3 switch guidance process of this cycle is ended. In S204, in response to determining that the level 3 switch trigger does not exist, the process proceeds to S205.

In S205, the process determines whether the lane change by the LCA has ended. In S205, in response to determining that the lane change has not ended, the process repeats S203, S204, and S205. As described above, even when the switch to autonomous traveling control is possible during the LC control period, the level 3 possible notification is not performed during the LC period. In S205, in response to determining that the lane change by the LCA has ended, the process proceeds to S206.

In S206, the process determines whether the level 3 start condition is satisfied with the movement destination lane as a determination target, similarly to S203. In S206, in response to determining that the switch to autonomous traveling control in the movement destination lane is not possible, the level 3 switch guidance process is ended. In S206, in response to determining that the switch to autonomous traveling control is possible even in the movement destination lane, the process proceeds to S207. In S207, the level 3 possible notification is performed, and the process proceeds to S208.

In S208, the process determines whether the level 3 switch trigger exists, similarly to S204. In S208, in response to determining that the level 3 switch trigger does not exist, the process returns to S207, and the level 3 possible notification is continued. In S208, in response to determining that the level 3 switch trigger exists, the process proceeds to S210 and perform the level 3 start notification, and then the level 3 switch guidance process is ended.

In the second embodiment described above, in the LC control period in which the lane change by the function of the LCA is being performed, when the switch to the autonomous traveling control without periphery monitoring obligation becomes possible, the execution of level 3 possible notification is suspended in the LC control period. Thus, it is possible to suppress presentation of information indicating a content different from a content of vehicle control, which is currently being executed, thereby the driver can feel less confused. In the second embodiment, the level 3 possible notification is performed after the end of LC control period. Thus, the driver can recognize that the switch to autonomous traveling control is possible, and can smoothly start to use the autonomous driving without periphery monitoring obligation. According to such a series of information presentation, it is possible to ensure the convenience of autonomous driving without periphery monitoring obligation.

Other Embodiments

Although multiple embodiments of the present disclosure have been described above, the present disclosure should not be construed as being limited to the above-described embodiments, and can be applied to various embodiments and combinations without departing from the spirit of the present disclosure.

The modes of the normal switch possible notification and the first to fourth switch possible notifications in the above embodiment can be changed as appropriate. For example, in a first modification of the above embodiment, the first switch possible notification and the second switch possible notification may be continuously displayed. In other words, the display of first switch possible notification, which is started during the LC control period, may be continued even after the LC control period ends as the second switch possible notification. The third switch possible notification and the fourth switch possible notification may be continuously displayed. In this case, the display of third switch possible notification, which is started during the LC control period, may be continued even after the LC control period ends as the fourth switch possible notification.

In a second modification of the above embodiment, the second switch possible notification, which is performed when the switch to level 3 becomes possible during the LC period, may be omitted. In a third modification of the above embodiment, the third switch possible notification, which is performed when the LCA is activated immediately after the switch to level 3 becomes possible, may be omitted. In a fourth modification of the above embodiment, the process of suspending the switch possible notification during the LC control period based on the state of periphery monitoring of the driver may be omitted.

In the autonomous driving system 50 of the above embodiment, both the lane change by the autonomous traveling control and the switch to the autonomous traveling control during the lane change by the LCA are permitted. In a fifth modification of the above embodiment, both the lane change by the autonomous traveling control and the switch to the autonomous traveling control during the lane change by the LCA may be prohibited. In a sixth modification of the above embodiment, while the lane change by the autonomous traveling control is permitted, the switch to the autonomous traveling control during the lane change by the LCA is prohibited. In the fifth and sixth modifications, the level 3 possible notification performed during the LC control period and performed after the end of LC control period are effective for ensuring the convenience of autonomous driving. In the fifth and sixth modifications, even though the level 3 switch trigger exists during the LC control period (see the branch in FIG. 4), the control switch to the autonomous traveling control and the level 3 possible notification (second switch possible notification) are performed after the end of LC control period.

In a seventh modification of the above embodiment, the functions of driving assist ECU 50a and the autonomous driving ECU 50b may be provided by a single autonomous driving ECU. That is, the functions of driving assist ECU 50a may be implemented in the autonomous driving ECU 50b in the seventh modification. In the seventh modification, the integrated autonomous driving ECU corresponds to an "autonomous driving control device". The functions of the HCU 100 may also be implemented in the integrated autonomous driving ECU. In such a configuration, the autonomous driving ECU also corresponds to the "presentation control device". A system including multiple ECUs may correspond to the "autonomous driving control device" and the "presentation control device".

In the above embodiments, the functions provided by the autonomous driving ECU and the HCU can be provided by (i) combination of software and hardware that executes the software, (ii) only the software, (iii) only the hardware, or (iv) a complex combination of (i) through (iii). Further, when such functions are provided by an electronic circuit as hardware, each function can also be provided by a digital circuit including a large number of logic circuits or an analog circuit.

Each processor described in the above embodiments may be hardware for arithmetic processing combined with a RAM. The processor includes at least one arithmetic core such as a central processor (CPU) and a graphics processor (GPU). The processor may further include a field-programmable gate array (FPGA), a neural network processor (NPU), an IP core having other dedicated functions, and the like. Such a processor may be configured to be individually mounted on a printed circuit board, or may be configured to be mounted on an application specific integrated circuit (ASIC), an FPGA, or the like. In addition, the form of a storage medium (a non-transitory tangible computer readable medium) that stores various programs and the like may also be appropriately changed. Further, the storage medium is not limited to the configuration provided on the circuit board, and may be provided in the form of a memory card or the like, inserted into a slot portion, and electrically connected to a control circuit such as an autonomous driving ECU or an HCU. In addition, the storage medium may be an optical disk, a hard disk drive, or the like serving as a copy base of the program to the autonomous driving ECU or the HCU.

The vehicle on which the autonomous driving system and the HMI system are mounted is not limited to a general private passenger car, and may be a vehicle, such as a rental car, a manned taxi, a shared car, a cargo truck, a bus, or the like. The vehicle equipped with the autonomous driving system and the HMI system may be a right-hand drive vehicle or a left-hand drive vehicle. Further, the traffic environment in which the vehicle travels may be a traffic environment premised on left-hand traffic or a traffic environment premised on right-hand traffic. The autonomous driving control and the information presentation control according to the present disclosure may be appropriately optimized according to the road traffic law of each country and region, the steering wheel position of the vehicle, and the like.

The controller and the method thereof described in the present disclosure may be implemented by a special purpose computer, which includes a processor programmed to execute one or more functions performed by computer programs. Alternatively, the device and the method thereof described in the present disclosure may also be implemented by a dedicated hardware logic circuit. Alternatively, the device and the method thereof described in the present disclosure may be implemented by one or more dedicated computers configured by a combination of a processor that executes a computer program and one or more hardware logic circuits. The computer program may be stored in a computer-readable non-transitory tangible recording medium as instructions to be executed by a computer.

What is claimed is:

1. A presentation control device used in a vehicle capable of traveling with autonomous driving function, the presentation control device controlling presentation of information relating to the autonomous driving function, the presentation control device comprising:
a traveling control grasping unit grasping whether a switch from a driving assist control, which requires a periphery monitoring by a driver as an obligation, to an autonomous traveling control, which does not require the periphery monitoring by the driver as the obligation, becomes possible; and
a notification control unit performing a switch possible notification indicating that the switch to the autonomous traveling control becomes possible,
wherein
the traveling control grasping unit further grasps whether a lane change by the autonomous driving function is being performed in a state which requires the periphery monitoring by the driver as the obligation, and
during a control period in which a lane change by the driving assist control being performed, in response that the switch to the autonomous traveling control becomes possible in a movement destination lane to which the vehicle plans to move by the lane change, the notification control unit performs the switch possible notification during the control period.

2. The presentation control device according to claim 1, wherein
the notification control unit performs a switch start notification indicating a start of the autonomous traveling control in response to the driving assist control being switched to the autonomous traveling control during the control period or after end of the lane change by the driving assist control.

3. The presentation control device according to claim 1, wherein,
when a state of the switch from the driving assist control to the autonomous traveling control being possible continues after end of the lane change by the driving assist control, the notification control unit performs the switch possible notification even after end of the control period.

4. The presentation control device according to claim 3, wherein
the switch possible notification is performed during the control period in a first notification mode as a first switch possible notification,
the switch possible notification is performed after the end of the control period in a second notification mode as a second switch possible notification, and
the first notification mode is different from the second notification mode.

5. The presentation control device according to claim 1, further comprising
a driver status grasping unit grasping a status of the periphery monitoring performed by the driver,
wherein the notification control unit suspends performing of the switch possible notification during the control period while the driver is performing the periphery monitoring in association with the lane change.

6. A non-transitory computer-readable storage medium storing a presentation control program, the presentation control program being used in a vehicle capable of traveling with autonomous driving function and controlling presentation of information relating to the autonomous driving function, the presentation control program comprising instructions to be executed by at least one processor and the instructions comprising:
grasping whether a switch from a driving assist control, which requires a periphery monitoring by a driver as an obligation, to an autonomous traveling control, which does not require the periphery monitoring by the driver as the obligation, becomes possible;

grasping whether a lane change by the autonomous driving function is being performed in a state which requires the periphery monitoring by the driver as the obligation; and during a control period in which a lane change by the driving assist control being performed, in response that the switch to the autonomous traveling control becomes possible in a movement destination lane to which the vehicle plans to move by the lane change, performing a switch possible notification indicating that the switch to the autonomous traveling control becomes possible during the control period.

7. A presentation control device used in a vehicle capable of traveling with autonomous driving function, the presentation control device controlling presentation of information relating to the autonomous driving function, the presentation control device comprising:

a traveling control grasping unit grasping whether a switch from a driving assist control, which requires a periphery monitoring by a driver as an obligation, to an autonomous traveling control, which does not require the periphery monitoring by the driver as the obligation, becomes possible; and a notification control unit performing a switch possible notification indicating that the switch to the autonomous traveling control becomes possible, wherein the traveling control grasping unit further grasps whether a lane change by the autonomous driving function is being performed in a state which requires the periphery monitoring by the driver as the obligation, and during a control period in which a lane change by the driving assist control being performed, even though the switch to the autonomous traveling control becomes possible in a movement destination lane to which the vehicle plans to move by the lane change, the notification control unit suspends performing of the switch possible notification during the control period and performs the switch possible notification after end of the control period.

8. A non-transitory computer-readable storage medium storing a presentation control program, the presentation control program being used in a vehicle capable of traveling with autonomous driving function and controlling presentation of information relating to the autonomous driving function, the presentation control program comprising instructions to be executed by at least one processor and the instructions comprising:

grasping whether a switch from a driving assist control, which requires a periphery monitoring by a driver as an obligation, to an autonomous traveling control, which does not require the periphery monitoring by the driver as the obligation, becomes possible;

grasping whether a lane change by the autonomous driving function is being performed in a state which requires the periphery monitoring by the driver as the obligation; and during a control period in which a lane change by the driving assist control being performed, even though the switch to the autonomous traveling control becomes possible in a movement destination lane to which the vehicle plans to move by the lane change, suspending performing of a switch possible notification during the control period and performing the switch possible notification after end of the control period.

9. A presentation control device used in a vehicle capable of traveling with autonomous driving function, the presentation control device controlling presentation of information relating to the autonomous driving function, the presentation control device comprising:

a traveling control grasping unit grasping whether a switch from a driving assist control, which requires a periphery monitoring by a driver as an obligation, to an autonomous traveling control, which does not require the periphery monitoring by the driver as the obligation, becomes possible; and a notification control unit performing a switch possible notification indicating that the switch to the autonomous traveling control becomes possible, wherein the traveling control grasping unit further grasps whether a lane change by the autonomous driving function is being performed in a state which requires the periphery monitoring by the driver as the obligation, and when the lane change by the driving assist control is started after performing of the switch possible notification and before the switch to the autonomous traveling control, the notification control unit performs the switch possible notification again after end of the lane change under a condition that the switch to the autonomous traveling control is possible after the end of lane change.

10. The presentation control device according to claim 9, wherein, during a control period in which the lane change by the driving assist control is being performed, the traveling control grasping unit grasps whether the switch to the autonomous traveling control is possible after the end of lane change, and when the switch to the autonomous traveling control after the end of lane change is determined to be possible during the control period, the notification control unit performs the switch possible notification during the control period.

11. A non-transitory computer-readable storage medium storing a presentation control program, the presentation control program being used in a vehicle capable of traveling with autonomous driving function and controlling presentation of information relating to the autonomous driving function, the presentation control program comprising instructions to be executed by at least one processor and the instructions comprising:

grasping whether a switch from a driving assist control, which requires a periphery monitoring by a driver as an obligation, to an autonomous traveling control, which does not require the periphery monitoring by the driver as the obligation, becomes possible;

performing a switch possible notification indicating that the switch to the autonomous traveling control becomes possible;

after performing the switch possible notification, grasping whether a lane change by the driving assist control is started before the switch to the autonomous traveling control; and when the lane change by the driving assist control is started before the switch to the autonomous traveling control, performing the switch possible notification again after end of the lane change under a condition that the switch to the autonomous traveling control is possible after the end of lane change.

12. An autonomous driving control device that enables a vehicle to travel by an autonomous driving function, the autonomous driving control device comprising:

a switch determination unit determining whether a switch from a driving assist control, which requires a periphery monitoring by a driver as an obligation, to an autonomous traveling control, which does not require the periphery monitoring by the driver as the obligation, is possible; and an assist control grasping unit grasping an execution state of a lane change by the driving assist control, wherein, during a control period in which the lane change by the driving assist control being executed, the switch determination unit switches from a first determination state to a second determination state, in the first determination state, the switch determination unit determines whether the switch from the driving assist control to the autonomous traveling control is possible with both of a traveling lane of the vehicle before the lane change is started and a movement destination lane to which the vehicle moves by the lane change as determination targets, and in the second determination state, the switch determination unit determines whether the switch to the autonomous traveling control is possible with the movement destination lane as the determination target.

13. A non-transitory computer-readable storage medium storing an autonomous driving control program, the autonomous driving control program enabling a vehicle to travel by an autonomous driving function and comprising instructions to be executed by at least one processor, the instructions comprising:

grasping an execution state of a lane change by a driving assist control which requires periphery monitoring by a driver of the vehicle as an obligation;

determining whether a switch from the driving assist control to an autonomous traveling control, which does not require the periphery monitoring by the driver as the obligation, is possible; and during a control period in which the lane change by the driving assist control being executed, switching from a first determination state to a second determination state, wherein the first determination state determines whether the switch from the driving assist control to the autonomous traveling control is possible with both of a traveling lane of the vehicle before the lane change is started and a movement destination lane to which the vehicle moves by the lane change as determination targets, and the second determination state determines whether the switch to the autonomous traveling control is possible with the movement destination lane as the determination target.

* * * * *